(12) United States Patent
Drees et al.

(10) Patent No.: US 8,788,097 B2
(45) Date of Patent: Jul. 22, 2014

(54) SYSTEMS AND METHODS FOR USING RULE-BASED FAULT DETECTION IN A BUILDING MANAGEMENT SYSTEM

(75) Inventors: Kirk H. Drees, Cedarburg, WI (US); Andrew J. Boettcher, Wauwatosa, WI (US); James P. Kummer, Wales, WI (US)

(73) Assignee: Johnson Controls Technology Company, Holland, MI (US)

( * ) Notice: Subject to any disclaimer, the term of this patent is extended or adjusted under 35 U.S.C. 154(b) by 473 days.

(21) Appl. No.: 12/916,145

(22) Filed: Oct. 29, 2010

(65) Prior Publication Data

US 2011/0047418 A1 Feb. 24, 2011

Related U.S. Application Data

(63) Continuation-in-part of application No. 12/819,977, filed on Jun. 21, 2010, now Pat. No. 8,600,556.

(60) Provisional application No. 61/219,326, filed on Jun. 22, 2009, provisional application No. 61/234,217, filed on Aug. 14, 2009, provisional application No. 61/302,854, filed on Feb. 9, 2010.

(51) Int. Cl.
   *G01M 1/38* (2006.01)
   *G05D 9/00* (2006.01)
(52) U.S. Cl.
   USPC .......... 700/275; 700/276; 700/286; 700/287; 700/288; 700/299; 700/290; 700/291
(58) Field of Classification Search
   None
   See application file for complete search history.

(56) References Cited

U.S. PATENT DOCUMENTS

| | | | |
|---|---|---|---|
| 2,812,141 | A | 11/1957 | Sueda et al. |
| 3,181,791 | A | 5/1965 | Axelrod |
| 3,641,326 | A | 2/1972 | Harte |
| 3,998,093 | A | 12/1976 | Bertolasi |
| 4,114,807 | A | 9/1978 | Naseck et al. |
| 4,182,180 | A | 1/1980 | Mott |
| 4,199,101 | A | 4/1980 | Bramow et al. |
| 4,211,089 | A | 7/1980 | Mueller et al. |
| 4,213,174 | A | 7/1980 | Morley et al. |

(Continued)

FOREIGN PATENT DOCUMENTS

| | | | |
|---|---|---|---|
| JP | 63-231127 A | 9/1988 |
| JP | 04-062352 A | 2/1992 |

(Continued)

OTHER PUBLICATIONS

International Search Report and Written Opinion for International Patent Application No. PCT/US2011/024079, mailed Oct. 24, 2011, 9 pages.

(Continued)

*Primary Examiner* — Kavita Padmanabhan
*Assistant Examiner* — Thomas Stevens
(74) *Attorney, Agent, or Firm* — Foley & Lardner LLP

(57) ABSTRACT

A controller for a building management system includes a system of rules for detecting faults in the building management system. The rules include content conditions and trigger conditions. The content conditions are not checked until one or more of the trigger conditions are met. A rule-based fault detection engine may be implemented by a low level building equipment controller. One or more thresholds for a rule may be automatically or manually adjusted.

24 Claims, 10 Drawing Sheets

(56) References Cited

U.S. PATENT DOCUMENTS

| | | | |
|---|---|---|---|
| 4,257,238 A | 3/1981 | Kountz et al. | |
| 4,319,461 A | 3/1982 | Shaw | |
| 4,325,223 A | 4/1982 | Cantley | |
| 4,346,446 A * | 8/1982 | Erbstein et al. | 702/182 |
| 4,432,031 A | 2/1984 | Premerlani | |
| 4,512,161 A | 4/1985 | Logan et al. | |
| 4,557,317 A * | 12/1985 | Harmon, Jr. | 165/201 |
| 4,558,595 A | 12/1985 | Kompelien | |
| 4,607,789 A | 8/1986 | Bowman | |
| 4,611,470 A | 9/1986 | Enstrom | |
| 4,622,922 A | 11/1986 | Miyagaki et al. | |
| 4,749,122 A | 6/1988 | Shriver et al. | |
| 4,776,301 A | 10/1988 | Dziubakowski | |
| 4,866,635 A * | 9/1989 | Kahn et al. | 706/46 |
| 4,876,858 A | 10/1989 | Shaw et al. | |
| 4,897,798 A | 1/1990 | Cler | |
| 4,916,909 A | 4/1990 | Mathur et al. | |
| 4,942,740 A | 7/1990 | Shaw et al. | |
| 4,964,126 A | 10/1990 | Musicus et al. | |
| 5,074,137 A * | 12/1991 | Harris et al. | 73/31.02 |
| 5,090,303 A * | 2/1992 | Ahmed | 454/58 |
| 5,099,436 A | 3/1992 | McCown et al. | |
| 5,103,391 A | 4/1992 | Barrett | |
| 5,115,967 A | 5/1992 | Wedekind | |
| 5,189,606 A | 2/1993 | Burns et al. | |
| 5,218,525 A | 6/1993 | Amasaki et al. | |
| 5,251,814 A | 10/1993 | Warashina et al. | |
| 5,253,159 A | 10/1993 | Bilas et al. | |
| 5,274,571 A | 12/1993 | Hesse et al. | |
| 5,299,312 A * | 3/1994 | Rocco, Jr. | 714/4.12 |
| 5,315,502 A | 5/1994 | Koyama et al. | |
| 5,346,129 A | 9/1994 | Shah et al. | |
| 5,351,855 A | 10/1994 | Nelson et al. | |
| 5,355,305 A | 10/1994 | Seem et al. | |
| 5,414,640 A | 5/1995 | Seem | |
| 5,426,421 A | 6/1995 | Gray | |
| 5,461,877 A | 10/1995 | Shaw et al. | |
| 5,467,287 A | 11/1995 | Wenner et al. | |
| 5,481,481 A | 1/1996 | Frey et al. | |
| 5,506,768 A | 4/1996 | Seem et al. | |
| 5,528,516 A | 6/1996 | Yemini et al. | |
| 5,552,763 A * | 9/1996 | Kirby | 340/506 |
| 5,555,195 A | 9/1996 | Jensen et al. | |
| 5,557,546 A | 9/1996 | Fukai et al. | |
| 5,566,084 A | 10/1996 | Cmar | |
| 5,568,377 A * | 10/1996 | Seem et al. | 700/37 |
| 5,572,878 A * | 11/1996 | Kapoor | 62/175 |
| 5,582,021 A | 12/1996 | Masauji | |
| 5,590,830 A | 1/1997 | Kettler et al. | |
| 5,592,147 A * | 1/1997 | Wong | 340/522 |
| 5,596,507 A | 1/1997 | Jones et al. | |
| 5,602,761 A | 2/1997 | Spoerre et al. | |
| 5,675,979 A | 10/1997 | Shah | |
| 5,682,329 A | 10/1997 | Seem et al. | |
| 5,751,916 A | 5/1998 | Kon et al. | |
| 5,769,315 A | 6/1998 | Drees | |
| 5,791,408 A | 8/1998 | Seem | |
| 5,838,561 A | 11/1998 | Owen | |
| 5,867,384 A | 2/1999 | Drees et al. | |
| 5,911,127 A | 6/1999 | Tulpule | |
| 5,918,200 A | 6/1999 | Tsutsui et al. | |
| 5,924,486 A | 7/1999 | Ehlers et al. | |
| 5,963,458 A | 10/1999 | Cascia | |
| 6,005,577 A | 12/1999 | Breitlow | |
| 6,006,142 A | 12/1999 | Seem et al. | |
| 6,021,401 A | 2/2000 | Oravetz et al. | |
| 6,029,092 A | 2/2000 | Stein | |
| 6,058,161 A * | 5/2000 | Anderson et al. | 379/22.03 |
| 6,067,083 A | 5/2000 | Glen et al. | |
| 6,122,605 A | 9/2000 | Drees et al. | |
| 6,161,764 A | 12/2000 | Jatnieks | |
| 6,178,362 B1 | 1/2001 | Woolard et al. | |
| 6,185,483 B1 | 2/2001 | Drees | |
| 6,216,956 B1 | 4/2001 | Ehlers et al. | |
| 6,219,590 B1 | 4/2001 | Bernaden, III et al. | |
| 6,223,544 B1 | 5/2001 | Seem | |
| 6,265,843 B1 | 7/2001 | West et al. | |
| 6,269,650 B1 | 8/2001 | Shaw | |
| 6,282,910 B1 * | 9/2001 | Helt | 62/229 |
| 6,296,193 B1 | 10/2001 | West et al. | |
| 6,324,659 B1 * | 11/2001 | Pierro | 714/48 |
| 6,366,832 B2 * | 4/2002 | Lomonaco et al. | 700/276 |
| 6,366,889 B1 | 4/2002 | Zaloom | |
| 6,369,716 B1 | 4/2002 | Abbas et al. | |
| 6,389,331 B1 | 5/2002 | Jensen et al. | |
| 6,408,228 B1 * | 6/2002 | Seem et al. | 700/276 |
| 6,415,276 B1 | 7/2002 | Heger et al. | |
| 6,415,617 B1 | 7/2002 | Seem | |
| 6,456,622 B1 | 9/2002 | Skaanning et al. | |
| 6,477,439 B1 | 11/2002 | Bernaden, III et al. | |
| 6,535,865 B1 | 3/2003 | Skaaning et al. | |
| 6,556,950 B1 * | 4/2003 | Schwenke et al. | 702/183 |
| 6,577,962 B1 | 6/2003 | Afshari | |
| 6,594,554 B1 | 7/2003 | Seem et al. | |
| 6,626,366 B2 | 9/2003 | Kayahara et al. | |
| 6,631,299 B1 | 10/2003 | Patel et al. | |
| 6,633,782 B1 | 10/2003 | Schleiss et al. | |
| 6,651,034 B1 | 11/2003 | Pander et al. | |
| 6,684,208 B2 | 1/2004 | Kil et al. | |
| 6,687,685 B1 | 2/2004 | Sadeghi et al. | |
| 6,757,668 B1 | 6/2004 | Goebel et al. | |
| 6,785,592 B1 | 8/2004 | Smith et al. | |
| 6,816,811 B2 | 11/2004 | Seem | |
| 6,834,208 B2 | 12/2004 | Gonzales et al. | |
| 6,853,882 B2 | 2/2005 | Dudley | |
| 6,862,499 B1 * | 3/2005 | Cretella et al. | 700/299 |
| 6,862,540 B1 | 3/2005 | Welch et al. | |
| 6,865,449 B2 | 3/2005 | Dudley | |
| 6,891,536 B2 * | 5/2005 | Smith | 345/421 |
| 6,937,909 B2 | 8/2005 | Seem | |
| 6,944,524 B2 * | 9/2005 | Shier et al. | 700/301 |
| 6,968,295 B1 | 11/2005 | Carr | |
| 6,973,793 B2 | 12/2005 | Douglas et al. | |
| 6,996,508 B1 | 2/2006 | Culp et al. | |
| 7,031,880 B1 | 4/2006 | Seem et al. | |
| 7,043,661 B2 | 5/2006 | Valadarsky et al. | |
| 7,096,387 B2 | 8/2006 | Durrant et al. | |
| 7,110,919 B2 | 9/2006 | Brindac et al. | |
| 7,113,890 B2 | 9/2006 | Frerichs et al. | |
| 7,113,988 B2 | 9/2006 | Chirashnya et al. | |
| 7,124,637 B2 | 10/2006 | Singhal et al. | |
| 7,181,648 B2 | 2/2007 | Bjorsne et al. | |
| 7,212,887 B2 | 5/2007 | Shah et al | |
| 7,216,021 B2 | 5/2007 | Matsubara et al. | |
| 7,218,974 B2 * | 5/2007 | Rumi et al. | 700/28 |
| 7,225,089 B2 | 5/2007 | Culp et al. | |
| 7,231,281 B2 | 6/2007 | Costa | |
| 7,246,039 B2 | 7/2007 | Moorhouse | |
| 7,251,582 B2 | 7/2007 | Singh et al. | |
| 7,356,548 B1 | 4/2008 | Culp et al. | |
| 7,409,303 B2 | 8/2008 | Yeo et al. | |
| 7,434,413 B2 | 10/2008 | Wruck | |
| 7,444,251 B2 | 10/2008 | Nikovski et al. | |
| 7,451,003 B2 * | 11/2008 | Chester et al. | 700/28 |
| 7,451,017 B2 | 11/2008 | McNally | |
| 7,519,485 B2 | 4/2009 | MacGregor | |
| 7,552,033 B1 | 6/2009 | Culp et al. | |
| 7,567,844 B2 | 7/2009 | Thomas et al. | |
| 7,577,550 B2 | 8/2009 | Ozonat et al. | |
| 7,578,734 B2 | 8/2009 | Ahmed et al. | |
| 7,636,613 B2 | 12/2009 | Borah et al. | |
| 7,685,830 B2 | 3/2010 | Thybo et al. | |
| 7,698,233 B1 | 4/2010 | Edwards et al. | |
| 7,705,269 B2 * | 4/2010 | Daniel | 219/130.21 |
| 7,822,709 B2 | 10/2010 | Godwin | |
| 7,827,813 B2 | 11/2010 | Seem | |
| 7,844,366 B2 | 11/2010 | Singh | |
| 7,873,442 B2 | 1/2011 | Tsui | |
| 7,873,485 B2 | 1/2011 | Castelli et al. | |
| 7,880,602 B2 * | 2/2011 | Kasamatsu | 340/461 |
| 7,881,889 B2 | 2/2011 | Barclay et al. | |
| 7,962,536 B2 | 6/2011 | Culp et al. | |
| 7,965,178 B1 * | 6/2011 | Schmuttor et al. | 340/506 |
| 8,172,154 B1 * | 5/2012 | Figley et al. | 236/44 A |

(56) References Cited

U.S. PATENT DOCUMENTS

| | | | |
|---|---|---|---|
| 8,200,344 | B2 | 6/2012 | Li et al. |
| 8,200,345 | B2 | 6/2012 | Li et al. |
| 8,219,250 | B2 | 7/2012 | Dempster et al. |
| 8,417,392 | B2 | 4/2013 | Higgins |
| 2001/0045960 | A1* | 11/2001 | Keeley .......................... 345/637 |
| 2002/0010563 | A1 | 1/2002 | Ratteree et al. |
| 2002/0016639 | A1 | 2/2002 | Smith et al. |
| 2002/0030114 | A1 | 3/2002 | Kayahara et al. |
| 2002/0045995 | A1* | 4/2002 | Shimazaki et al. ............. 702/77 |
| 2002/0055820 | A1* | 5/2002 | Scannell ........................... 702/3 |
| 2002/0138782 | A1 | 9/2002 | Durrant et al. |
| 2002/0152298 | A1 | 10/2002 | Kikta et al. |
| 2002/0183988 | A1 | 12/2002 | Skaanning et al. |
| 2003/0014160 | A1 | 1/2003 | Nordquist et al. |
| 2003/0079483 | A1 | 5/2003 | Komatsu et al. |
| 2003/0090371 | A1* | 5/2003 | Teowee et al. ........... 340/426.24 |
| 2003/0093186 | A1 | 5/2003 | Patterson et al. |
| 2003/0105556 | A1 | 6/2003 | Enis et al. |
| 2003/0114942 | A1 | 6/2003 | Varone et al. |
| 2003/0135339 | A1 | 7/2003 | Gristina et al. |
| 2003/0172087 | A1 | 9/2003 | Godwin |
| 2003/0229572 | A1 | 12/2003 | Raines et al. |
| 2004/0002776 | A1 | 1/2004 | Bickford |
| 2004/0010733 | A1 | 1/2004 | S. et al. |
| 2004/0072535 | A1* | 4/2004 | Schneider et al. ............. 454/229 |
| 2004/0102937 | A1 | 5/2004 | Ibrahim |
| 2004/0153819 | A1 | 8/2004 | Bjorsne et al. |
| 2004/0164690 | A1 | 8/2004 | Degner et al. |
| 2004/0186630 | A1* | 9/2004 | Shier et al. ..................... 700/301 |
| 2005/0006488 | A1 | 1/2005 | Stanimirovic |
| 2005/0040250 | A1 | 2/2005 | Wruck |
| 2005/0114311 | A1 | 5/2005 | Cheng et al. |
| 2005/0160324 | A1 | 7/2005 | Przytula et al. |
| 2005/0192680 | A1 | 9/2005 | Cascia et al. |
| 2005/0256661 | A1 | 11/2005 | Salsbury et al. |
| 2005/0278047 | A1 | 12/2005 | Ahmed |
| 2006/0058900 | A1 | 3/2006 | Johanson et al. |
| 2006/0058923 | A1 | 3/2006 | Kruk et al. |
| 2006/0090467 | A1 | 5/2006 | Crow |
| 2006/0106739 | A1 | 5/2006 | Holzbauer et al. |
| 2006/0167591 | A1 | 7/2006 | McNally |
| 2006/0224254 | A1* | 10/2006 | Rumi et al. ...................... 700/28 |
| 2006/0259285 | A1 | 11/2006 | Bahel et al. |
| 2007/0023533 | A1 | 2/2007 | Liu |
| 2007/0061046 | A1 | 3/2007 | Mairs et al. |
| 2007/0067062 | A1 | 3/2007 | Mairs et al. |
| 2008/0097651 | A1 | 4/2008 | Shah et al. |
| 2008/0147465 | A1 | 6/2008 | Raines et al. |
| 2008/0172258 | A1* | 7/2008 | Weger et al. ...................... 705/4 |
| 2008/0179408 | A1 | 7/2008 | Seem |
| 2008/0183424 | A1 | 7/2008 | Seem |
| 2008/0275674 | A1 | 11/2008 | Reghetti et al. |
| 2008/0277486 | A1 | 11/2008 | Seem et al. |
| 2008/0300963 | A1 | 12/2008 | Seetharaman et al. |
| 2009/0012654 | A1 | 1/2009 | Culp et al. |
| 2009/0076790 | A1 | 3/2009 | Fein et al. |
| 2009/0083583 | A1 | 3/2009 | Seem et al. |
| 2009/0099889 | A1* | 4/2009 | Okamoto et al. ................. 705/7 |
| 2009/0112522 | A1 | 4/2009 | Rasmussen |
| 2009/0132096 | A1 | 5/2009 | Swarztrauber et al. |
| 2009/0138203 | A1 | 5/2009 | Iossifov et al. |
| 2009/0204267 | A1 | 8/2009 | Sustaeta et al. |
| 2009/0216469 | A1 | 8/2009 | Marik et al. |
| 2009/0308941 | A1 | 12/2009 | Patch |
| 2009/0327890 | A1* | 12/2009 | Mertz et al. .................... 715/716 |
| 2010/0004882 | A1 | 1/2010 | Chu et al. |
| 2010/0042453 | A1 | 2/2010 | Scaramellino et al. |
| 2010/0049676 | A1 | 2/2010 | Devitt et al. |
| 2010/0070907 | A1 | 3/2010 | Harrod et al. |
| 2010/0082161 | A1 | 4/2010 | Patch |
| 2010/0211222 | A1 | 8/2010 | Ghosn |
| 2010/0257108 | A1 | 10/2010 | Skeels et al. |
| 2010/0274366 | A1 | 10/2010 | Fata et al. |
| 2010/0283606 | A1 | 11/2010 | Tsypin et al. |
| 2010/0286937 | A1 | 11/2010 | Hedley et al. |
| 2010/0324741 | A1 | 12/2010 | House et al. |
| 2010/0324962 | A1 | 12/2010 | Nesler et al. |
| 2011/0061015 | A1 | 3/2011 | Drees et al. |
| 2011/0178977 | A1 | 7/2011 | Drees |
| 2011/0246381 | A1 | 10/2011 | Fitch et al. |
| 2011/0320045 | A1 | 12/2011 | Salsbury et al. |

FOREIGN PATENT DOCUMENTS

| | | |
|---|---|---|
| JP | 10-047738 A | 2/1998 |
| JP | 2006-079426 A | 3/2006 |
| SU | 535103 A0 | 11/1976 |
| WO | WO-00/68744 A1 | 11/2000 |
| WO | WO 2009/012282 A2 | 1/2009 |

OTHER PUBLICATIONS 90.1 User's Manual: Energy Standard for Buildings Execept Low-Rise Residential Buildings, ANSI/ASHRAE/IESNA Standard 90.1-2004, 7 pages.
ASHRAE Standard, Energy Standard for Buildings Except Low-Rise Residential Buildings, ANSI/ASHRAE/IESNA Standard 90.1-2004, cover page and pp. 36-38.
Cowan, Review of Recent Commercial Roof Top Unit Field Studies in the Pacific Northwest and California, report for Northwest Power and Conservation Council and Regional Technical Forum, Oct. 8, 2004, 18 pages.
DOE Federal Emergency Management Program, Actions You Can Take to Reduce Cooling Costs, taken from http://www1.eere.energy.gov/femp/pdfs/om_cooling.pdf, believed to be available May 2005, 8 pages.
Financial Times Energy, Inc. Economizers, Energy Design Resources, taken from http://www.energydesignresources.com/resource/28/, believed to be available by at least Jan. 2007, 30 pages.
House et al., An Expert Rule Set for Fault Detection in Air-Handling Units, ASHRAE Transactions, 32 pages, 2001.
Salsbury, A Controller for HVAC Systems with Embedded Fault Detection Capabilities Based on Simulation Models, presented at the International Building Simulation Conference in Kyoto, Japan, Sep. 1999, 8 pages.
Sane et al., Building HVAC Control Systems—Role of Controls and Optimization, Proceedings of the American Control Conference Minneapolis, Minnesota, Jun. 14-16, 2006, 6 pages.
ASHRAE Guideline 14-2002, Measurement of Energy and Demand Savings, 2002, 170 pages.
Barnett et al., Outliers in Statistical Data, 1994, 14 pages.
Iglewicz et al., vol. 16: How to Detect and Handle Outliers, The ASQC Basic References in Quality Control: Statistical Techniques, 1993, 15 pages.
International Performance Measurement & Verification Protocol, Concepts and Options for Determining Energy and Water Savings, Mar. 2002, 93 pages.
Jaehn, The Zone Control Chart, Quality Progress, Jul. 1991, 6 pages.
LeBlanc, Sur l'electrification des Chemins de fer au Moyen de Courants Alternatifs de Frequence Elevee, Revue Generale de l'Electricite, 1922, 4 pages.
Leyva et al., MPPT of Photovoltaic Systems using Extremum-Seeking Control, IEEE Transactions on Aerospace and Electronic Systems, Jan. 2006, 10 pages.
Li et al., Extremum Seeking Control of a Tunable Thermoacoustic Cooler, IEEE Transactions on Control Systems Technology, Jul. 2005, 10 pages.
Mathews et al., A Tool for Integrated HVAC, Building, Energy, and Control Analysis Part 1: Overview of Quick Control, 1999, 21 pages.
Nelson, Best Target Value for a Production Process, Journal of Quality Technology, Apr. 1978, 4 pages.
Quesenberry, SPC Methods of Quality Improvement, 1997, 49 pages.
Rosner, Percentage Points for a Generalized ESD Many-Outlier Procedure, Technometrics, May 1983, 10 pages.
Teel, Lyapunov Methods in Nonsmooth Optimization, Part I: Quasi-Newton Algorithms for Lipschitz, Regular Functions, Dec. 2000, 8 pages.
Teel, Lyapunov Methods in Nonsmooth Optimization, Part II: Persistenly Exciting Finite Differences, Dec. 2000, 8 pages.

(56) References Cited

OTHER PUBLICATIONS

Titica et al., Adaptive Extremum Seeking Control of Fed-Batch Bioreactors, European Journal of Control, 2003, 14 pages.
U.S. Department of Energy, M&V Guidelines: Measurement and Verification for Federal Energy Projects, Apr. 2008, 306 pages.
International Search Report and Written Opinion for International Patent Application No. PCT/US2008/070091, mailed Sep. 30, 2009, 13 pages.
International Search Report and Written Opinion for International Patent Application No. PCT/US2008/070118, mailed Oct. 19, 2009, 11 pages.
Office Action for U.S. Appl. No. 11/699,860, mail date Aug. 20, 2009, 18 pages.
Office Action for U.S. Appl. No. 11/699,860, mail date Jun. 9, 2010, 9 pages.
Office Action for U.S. Appl. No. 12/819,977, mail date Sep. 13, 2012, 21 pages.
Office Action for U.S. Appl. No. 12/949,660, mail date Nov. 7, 2012, 33 pages.
Office Action for U.S. Appl. No. 13/023,392, mail date Nov. 7, 2012, 31 pages.
Office Action for U.S. Appl. No. 11/699,859, mail date Mar. 15, 2010, 12 pages.
Edelson, Building Automation Security in Office Building, Elsevier, 2004, 3 pages.
Geweke, Efficient Simulation from the Multivariate Normal and Student-T Distributions Subject to Linear Constraints and the Evaluation of Constraint Probabilities, Computing Science and Statistics, Seattle, Apr. 22-24, 1991, 14 pages.
Kastner, Communication Systems for Building Automation and Control, 2005, 26 pages.
Katipamula et al., Methods of Fault Detection, Diagnostics, and Prognostics for Building Systems—A Review, Part II, American Society of Heating, Refrigerating and Air Conditioning Engineers, 2005, 19 pages.
Kim et al., Performance Enhancement of Cyclostationarity Detector by Utilizing Multiple Cyclic Frequencies of OFDM Signals, IEEE DySPAN, 2010, 8 pages.
Martin et al., Supervisory Control for Energy Savings and Thermal Comfort in Commercial Building HVAC Systems, AAAI Technical Report, 2002, 8 pages.
Uraikul et al., Artificial Intelligence for Monitoring and Supervisory Control of Process Systems, 2006, 17 pages.
Wong et al., Building Automation in the 21st Century, IEEE, 1997, 6 pages.
Office Action for U.S. Appl. No. 13/077,508, mail date May 22, 2013, 26 pages.
Office Action for U.S. Appl. No. 13/167,571, mail date Jun. 26, 2013, 40 pages.
Andersen, Stochastic Modeling of Energy Systems, Technical University of Denmark, Department of Informatics and Mathematical Modeling, 2001, 112 pages.
Notice of Allowance for U.S. Appl. No. 12/819,977, mail date Jul. 30, 2013, 9 pages.
Office Action for U.S. Appl. No. 13/077,508, mail date Dec. 3, 2013, 39 pages.
Office Action for U.S. Appl. No. 13/167,571, mail date Nov. 5, 2013, 43 pages.
Office Action for U.S. Appl. No. 13/246,644, mail date Oct. 4, 2013, 15 pages.
Office Action for U.S. Appl. No. 13/252,092, mail date Nov. 19, 2013, 12 pages.
Shakeri et al., "Optimal and Near-Optimal Algorithms for Multiple Fault Diagnosis with Unreliable Tests", IEEE, 1996, pp. 473-482.
Sreedharan et al., Comparison of Chiller Models for Use in Model-Based Fault Detection, eScholarship, 2001, 12 pages.
Tudoroiu et al., "Fault Detection and Diagnostic of Valve Actuators in HVAC System", IEEE, 2005, pp. 1281-1286.

\* cited by examiner

SYSTEMS AND METHODS FOR USING RULE-BASED FAULT DETECTION IN A BUILDING MANAGEMENT SYSTEM

CROSS-REFERENCE TO RELATED PATENT APPLICATIONS

The present application is a continuation-in-part of U.S. application Ser. No. 12/819,977, filed Jun. 21, 2010, which claims the benefit of U.S. Provisional Application No. 61/219,326, filed Jun. 22, 2009, U.S. Provisional Application No. 61/234,217, filed Aug. 14, 2009, and U.S. Provisional Application No. 61/302,854, filed Feb. 9, 2010. The entireties of U.S. application Ser. No. 12/819,977 and U.S. Provisional Application Nos. 61/219,326, 61/234,217, and 61/302,854 are hereby incorporated by reference.

BACKGROUND

The present invention relates generally to the field of building management systems. The present invention more particularly relates to systems and methods for detecting faults within a building management system.

Fault detection is an element of some building management systems. Equipment faults increase energy consumption, decrease equipment lifespans and cause other undesirable effects. Many systems today use fault detection to generate system alerts and drive diagnostic procedures. Overly sensitive fault detection can lead to an excess in the number of alerts of low priority or false alerts, which can decrease system performance, can waste diagnostic resources, or can eventually be ignored by users. It is challenging and difficult to develop fault detection strategies for building management systems.

SUMMARY

One embodiment of the invention relates to a method of detecting faults in a building management system using a threshold adjustment. The method includes using a stored rule condition to detect faults in the building management system, at a computer of the building management system. The method further includes using the computer to determine a need for a threshold adjustment based on at least one of fault detection data or building management system performance data. The method also includes determining a new threshold value for the rule condition. The method further includes adjusting the stored rule condition to utilize the new threshold value and, at the computer, using the adjusted rule to detect a second fault in the building management system.

In some embodiments, the method may further include causing a graphical user interface to be displayed on an electronic display device configured to receive a new threshold as input and the rule condition is adjusted in response to the user input. In another embodiment, a processing circuit completes the determining and adjusting steps without user input. In another embodiment, the new threshold value is determined by comparing the threshold to an estimated error for a measurement value obtained from a sensor. The new threshold value may also be determined by comparing an estimated power consumption of a controlled device to an actual power consumption of the controlled device. In yet another embodiment, the rule condition has a trigger condition and a content condition and the step of using the adjusted rule condition to detect a fault comprises checking the trigger condition to determine whether to process the content condition. In another embodiment, the fault detection data comprises a history of detected faults and the computer determines a need for the threshold adjustment by determining when a fault has frequently occurred.

Another embodiment of the invention relates to a method of detecting faults in a building management system that employs fault detection rules on a second controller. The method includes using a master controller to control a second controller. The method further includes collecting equipment data at the second controller from the building equipment and using the building equipment data to control the building equipment. The method also includes processing the collected building equipment data at the second controller relative to a rule condition. The method yet further includes detecting a fault in the building equipment based on the processing of the collected building equipment data relative to the rule condition. The method further includes reporting the detected fault to the master controller from the second controller.

In some embodiments, the second controller is an equipment controller that directly controls the building equipment or is the lowest level of controller in the building management system. In another embodiment, the equipment controller is an air handling unit controller and the collected building equipment data comprises sensor or actuator data for an air handling unit. In other embodiments, the rule condition is selectively used based on an operational state of the second controller and without querying or communicating with the master controller. In yet another embodiment, the second controller conducts the collecting, processing, and detecting steps without querying or receiving data from the master controller, another upstream controller, or a downstream controller. In another embodiment, the rule condition has a trigger condition and a content condition and the step of using the adjusted rule condition to detect a fault comprises checking the trigger condition to determine whether to process the content condition.

Another embodiment of the invention relates to a method of detecting faults in a building management system. The method includes recalling a stored rule and identifying a trigger condition and a content condition within the rule. The method also includes checking the trigger condition to determine whether to process the content condition. The method further includes detecting a fault by processing the content condition.

In some embodiments, the trigger condition is a time delay based on the amount of time needed for a controller to reach a steady state and the checking step includes delaying processing of the content condition for the time delay specified by the trigger condition. In another embodiment, the trigger condition is based on an operational state of a controller and the checking step includes recalling the current operational state of the controller from a finite state machine within the controller and comparing the trigger condition to the current operational state of the controller. In other embodiments, the trigger condition is stored within a library of predefined trigger conditions in a memory, the content condition is stored within a library of predefined content conditions in a memory, and the method includes building a rule by selecting at least one trigger condition from the library of predefined trigger conditions and at least one content condition from the library of predefined content conditions. In yet another embodiment, the method may further include recalling a trigger condition from a library of predefined trigger conditions, recalling a content condition from a library of predefined content conditions, causing a graphical user interface to be displayed on an electronic device configured to receive user input, associating the trigger condition and the content condition to form a rule in response to the user input, and storing the rule in a memory.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION OF THE EXEMPLARY EMBODIMENTS

The present invention relates to a building management system configured to improve building efficiency, to enable greater use of renewable energy sources, and to provide more comfortable and productive buildings.

A building management system (BMS) is, in general, hardware and/or software configured to control, monitor, and manage devices in or around a building or building area. BMS subsystems or devices can include heating, ventilation, and air conditioning (HVAC) subsystems or devices, security subsystems or devices, lighting subsystems or devices, fire alerting subsystems or devices, elevator subsystems or devices, other devices that are capable of managing building functions, or any combination thereof.

Figure 1A:
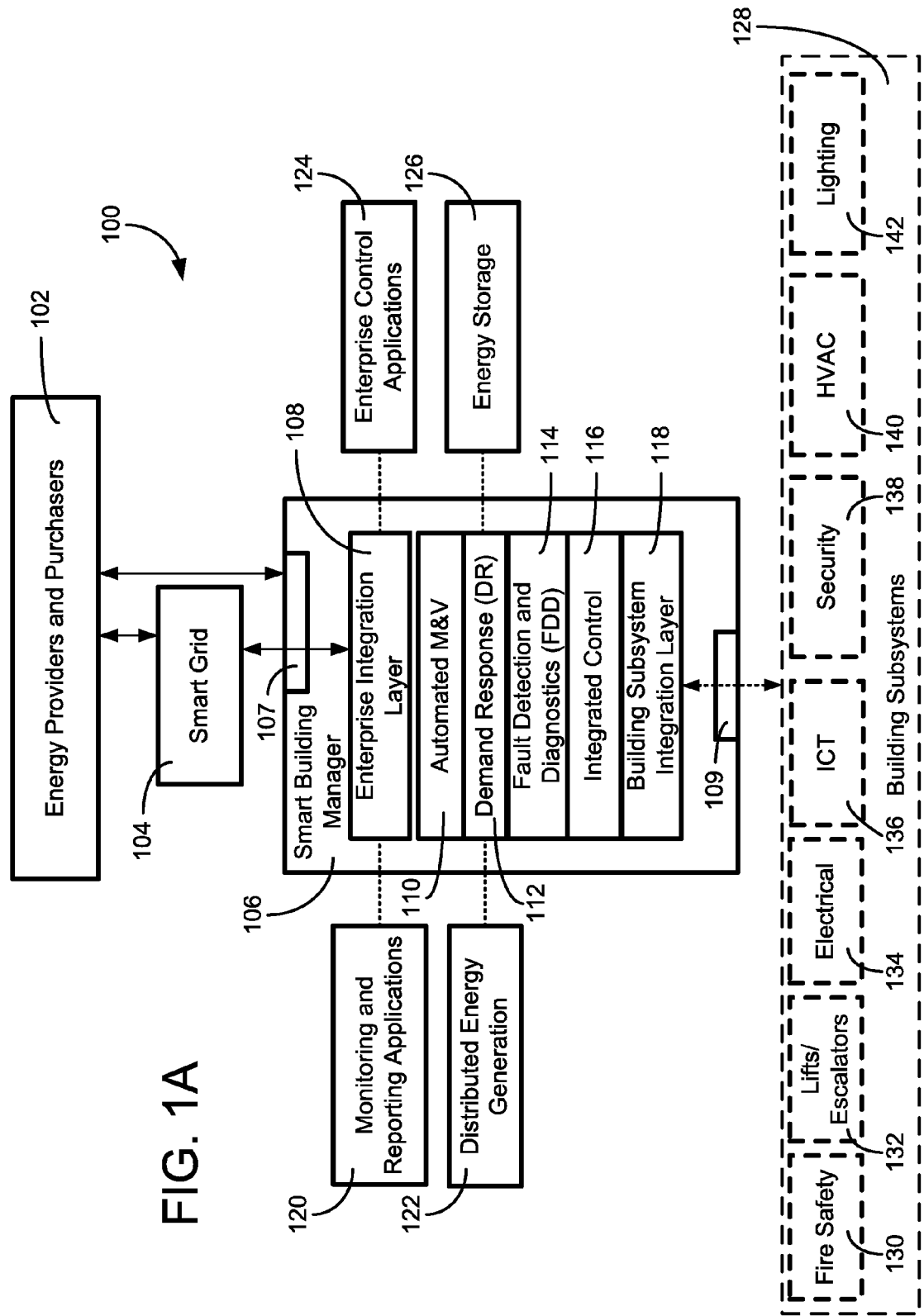
FIG. 1A is a block diagram of a building manager connected to a smart grid and a plurality of building subsystems, according to an exemplary embodiment.

Referring now to FIG. 1A, a block diagram of a system 100 including a smart building manager 106 is shown, according to an exemplary embodiment. Smart building manager 106 is connected to a smart grid 104 and a plurality of building subsystems 128. The building subsystems 128 may include a building electrical subsystem 134, an information communication technology (ICT) subsystem 136, a security subsystem 138, a HVAC subsystem 140, a lighting subsystem 142, a lift/escalators subsystem 132, and a fire safety subsystem 130. The building subsystems 128 can include fewer, additional, or alternative subsystems. For example, building subsystems 128 may also or alternatively include a refrigeration subsystem, an advertising or signage system subsystem, a cooking subsystem, a vending subsystem, or a printer or copy service subsystem. Conventionally these systems are autonomous and managed by separate control systems. The smart building manager described herein is configured to achieve energy consumption and energy demand reductions by integrating the management of the building subsystems.

Each of building subsystems 128 include any number of devices, controllers, and connections for completing their individual functions and control activities. For example, HVAC subsystem 140 may include a chiller, a boiler, any number of air handling units, economizers, field controllers, supervisory controllers, actuators, temperature sensors, or other devices for controlling the temperature within a building. As another example, lighting subsystem 142 may include any number of light fixtures, ballasts, lighting sensors, dimmers, or other devices configured to controllably adjust the amount of light provided to a building space. Security subsystem 138 may include occupancy sensors, video surveillance cameras, digital video recorders, video processing servers, intrusion detection devices, access control devices and servers, or other security-related devices.

In an exemplary embodiment, the smart building manager 106 is configured to include: a communications interface 107 to the smart grid 104 outside the building, an interface 109 to disparate subsystems 128 within a building (e.g., HVAC, lighting security, lifts, power distribution, business, etc.), and an interface to applications 120, 124 (network or local) for allowing user control, and the monitoring and adjustment of the smart building manager 106 or subsystems 128. Enterprise control applications 124 may be configured to provide subsystem-spanning control to a graphical user interface (GUI) or to any number of enterprise-level business applications (e.g., accounting systems, user identification systems, etc.). Enterprise control applications 124 may also or alternatively be configured to provide configuration GUIs for configuring the smart building manager 106. In yet other embodiments enterprise control applications 124 can work with layers 110-118 to optimize building performance (e.g., efficiency, energy use, comfort, or safety) based on inputs received at the interface 107 to the smart grid and the interface 109 to building subsystems 128. In an exemplary embodiment smart building manager 106 is integrated within a single computer (e.g., one server, one housing, etc.). In various other exemplary embodiments the smart building manager 106 can be distributed across multiple servers or computers (e.g., that can exist in distributed locations).

Figure 1B:
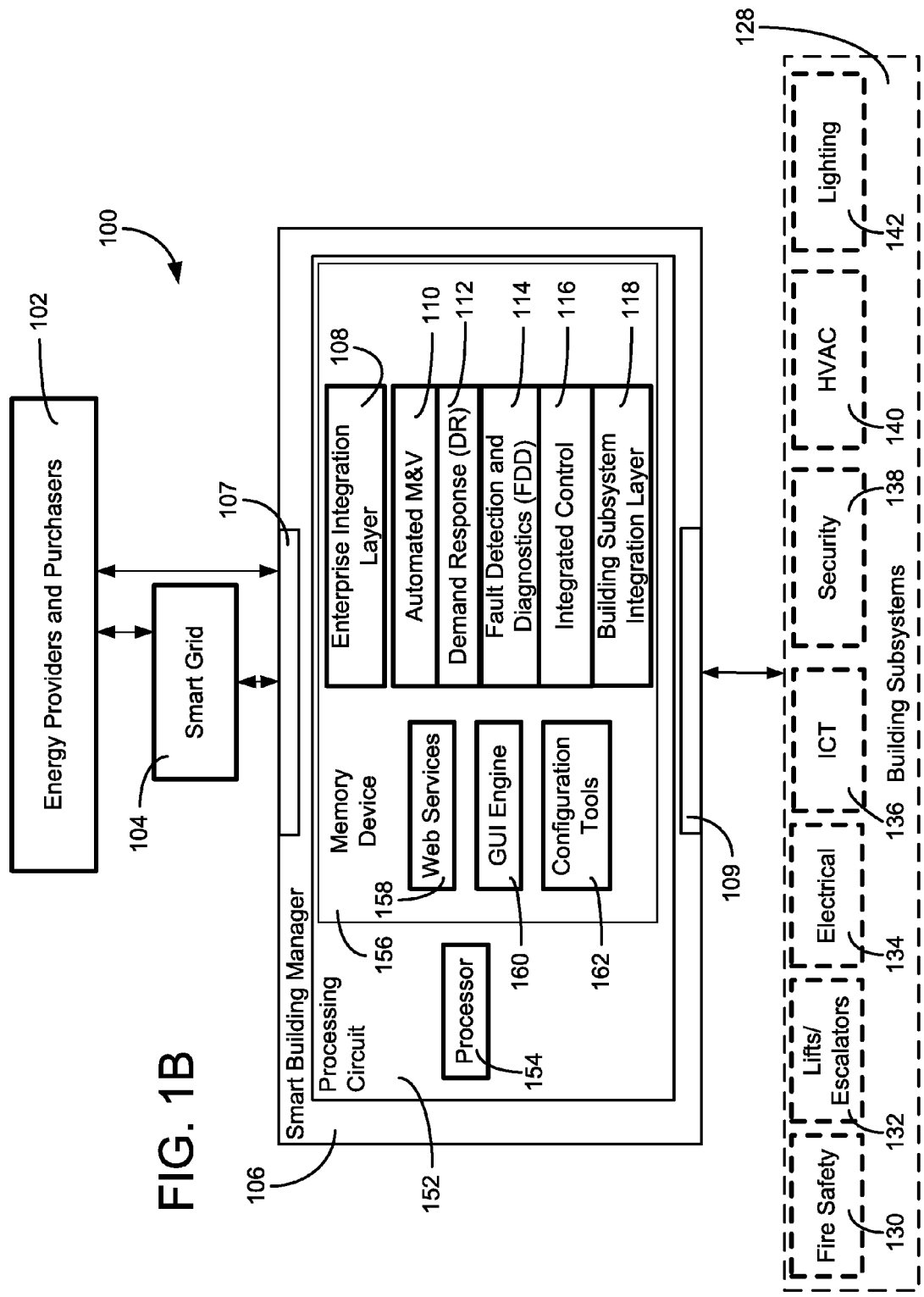
FIG. 1B is a more detailed block diagram of the building manager shown in FIG. 1A, according to an exemplary embodiment.

FIG. 1B illustrates a more detailed view of smart building manager 106, according to an exemplary embodiment. In particular, FIG. 1B illustrates smart building manager 106 as having a processing circuit 152. Processing circuit 152 is shown to include a processor 154 and memory device 156. Processor 154 can be implemented as a general purpose processor, an application specific integrated circuit (ASIC), one or more field programmable gate arrays (FPGAs), a group of processing components, or other suitable electronic processing components. Memory device 156 (e.g., memory, memory unit, storage device, etc.) is one or more devices (e.g., RAM, ROM, Flash memory, hard disk storage, etc.) for storing data and/or computer code for completing and/or facilitating the various processes, layers and modules described in the present application. Memory device 156 may be or include volatile memory or non-volatile memory. Memory device 156 may include database components, object code components, script components, or any other type of information structure for supporting the various activities and information structures described in the present application. According to an exemplary embodiment, memory device 156 is communicably connected to processor 154 via processing circuit 152 and includes computer code for executing (e.g., by processing circuit 152 and/or processor 154) one or more processes described herein.

Communications interfaces 107, 109 can be or include wired or wireless interfaces (e.g., jacks, antennas, transmitters, receivers, transceivers, wire terminals, etc.) for conducting data communications with, e.g., smart grid 104, energy providers and purchasers 102, building subsystems 128, or other external sources via a direct connection or a network connection (e.g., an Internet connection, a LAN, WAN, or WLAN connection, etc.). For example, communications interfaces 107, 109 can include an Ethernet card and port for sending and receiving data via an Ethernet-based communications link or network. In another example, communications interfaces 107, 109 can include a WiFi transceiver for communicating via a wireless communications network. In another example, one or both of interfaces 107, 109 may include cellular or mobile phone communications transceivers. In one embodiment communications interface 107 is a power line communications interface and communications interface 109 is an Ethernet interface. In other embodiments, both communications interface 107 and communications interface 109 are Ethernet interfaces or are the same Ethernet interface. Further, while FIG. 1A shows applications 120 and 124 as existing outside of smart building manager 106, in some embodiments applications 120 and 124 may be hosted within smart building manager 106 generally or memory device 156 more particularly.

Building Subsystem Integration Layer

Referring further to FIG. 1B, the building subsystem integration layer 118 is configured to manage communications between the rest of the smart building manager 106's components and the building subsystems. The building subsystem integration layer 118 may also be configured to manage communications between building subsystems. The building subsystem integration layer 118 may be configured to translate communications (e.g., sensor data, input signals, output signals, etc.) across a plurality of multi-vendor/multi-protocol systems. For example, the building subsystem integration layer 118 may be configured to integrate data from subsystems 128.

Figure 2:
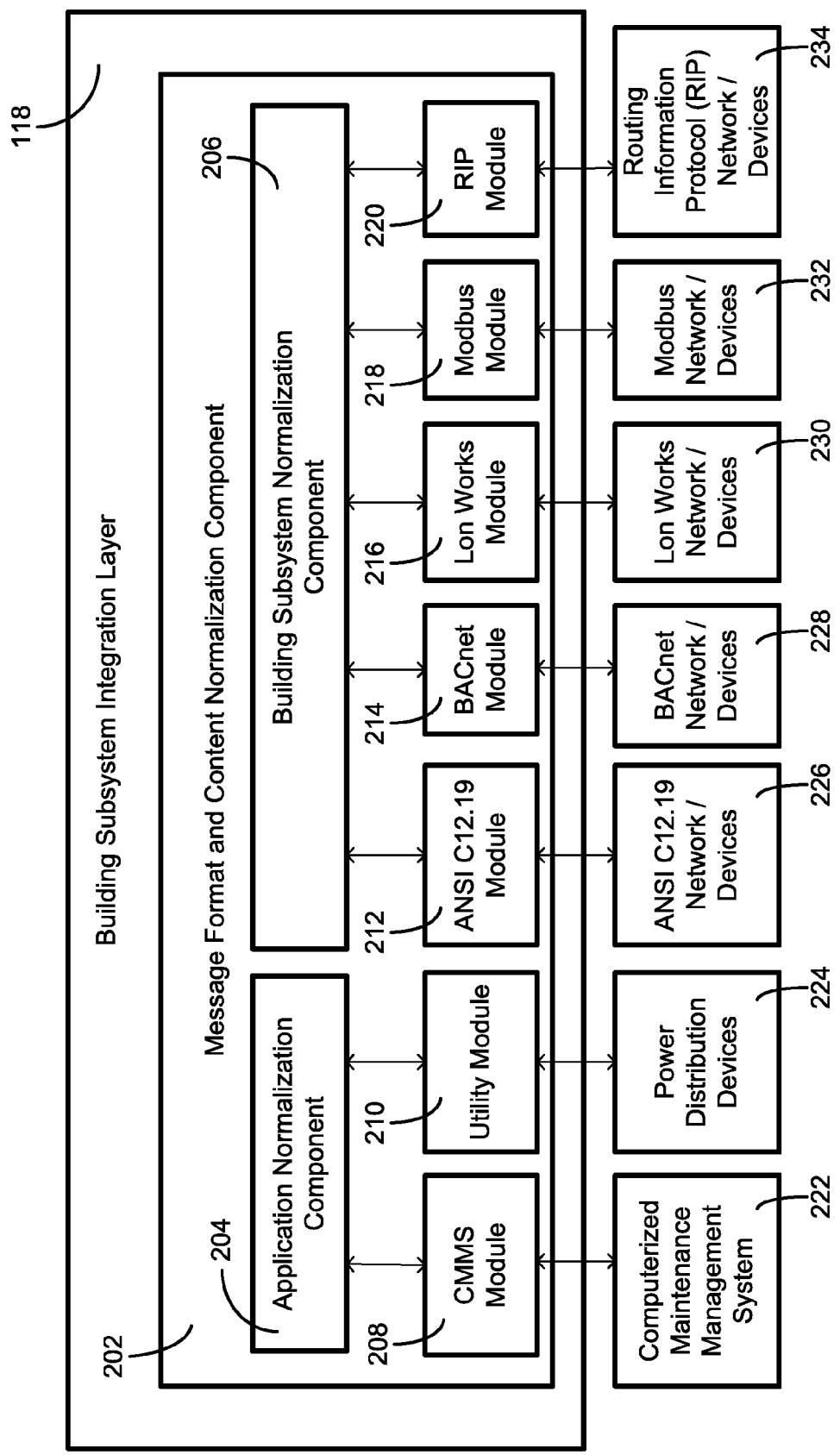
FIG. 2 is a block diagram of the building subsystem integration layer shown in FIG. 1A, according to an exemplary embodiment.

In FIG. 2, the building subsystem integration layer 118 is shown in greater detail to include a message format and content normalization component 202. The message format and content normalization component 202 is configured to convert data messages for and from disparately protocolled devices or networks (e.g., different building subsystems, differently protocolled smart-grid sources, etc.). The message format and content normalization component 202 is shown to include two subcomponents, an application normalization component 204 and a building subsystem normalization component 206. The application normalization component 204 is a computer function, object, service, or combination thereof configured to drive the conversion of communications for and from applications (e.g., enterprise level applications 120, 124 shown in FIG. 1A, a computerized maintenance management system 222, utility company applications via smart grid 104 shown in FIG. 1A, etc.). The building subsystem normalization component 206 is a computer function, object, service, or combination thereof configured to drive the conversion of communications for and from building subsystems (e.g., building subsystems 128 shown in FIG. 1A, building subsystem controllers, building devices, security systems, fire systems, etc.). The application normalization component 204 and the building subsystem normalization component 206 are configured to accommodate multiple communications or data protocols. In some embodiments, the application normalization component 204 and the building subsystem normalization component 206 are configured to conduct the conversion for each protocol based on information stored in modules 208-220 (e.g., a table, a script, in memory device 156 shown in FIG. 1B) for each of systems or devices 222-234. The protocol modules 208-220 may be, for example, schema maps or other descriptions of how a message for one protocol should be translated to a message for a second protocol. In some embodiments the modules 208-220 may be "plug-in" drivers that can be easily installed to or removed from a building subsystem integration layer 118 (e.g., via an executable installation routine, by placing a file in an interfaces folder, etc.) during setup. For example, modules 208-220 may be vendor specific (e.g., Johnson Controls, Honeywell, Siemens, etc.), standards-based (e.g., BACnet, ANSI C12.19, Lon Works, Modbus, RIP, SNMP, SOAP, web services, HTML, HTTP/HTTPS, XML, XAML, TFTP, DHCP, DNS, SMTP, SNTP, etc.), user built, user selected, and/or user customized. In some embodiments the application normalization component 204 or building subsystem normalization component 206 are configured for compatibility with new modules or drivers (e.g., user defined or provided by a vendor or third party). In such embodiments, message format and content normalization component 202 may advantageously be scaled for future applications or case-specific requirements (e.g., situations calling for the use of additional cyber security standards such as data encryption/decryption) by changing the active module set or by installing a new module.

Using message format and content normalization component 202, the building subsystem integration layer 118 can be configured to provide a service-oriented architecture for providing cross-subsystem control activities and cross-subsystem applications. The message format and content normalization component 202 can be configured to provide a relatively small number of straightforward interfaces (e.g., application programming interfaces (APIs)) or protocols (e.g., open protocols, unified protocols, common protocols) for use by layers 108-116 (shown in FIG. 1A) or external applications (e.g., 120, 124 shown in FIG. 1A) and to "hide" such layers or applications from the complexities of the underlying subsystems and their particular data transport protocols, data formats, semantics, interaction styles, and the like. Configuration of the message format and content normalization component 202 may occur automatically (e.g., via a building subsystem and device discovery process), via user configuration, or by a combination of automated discovery and user configuration. User configuration may be driven by providing one or more graphical user interfaces or "wizards" to a user, the graphical user interfaces allowing the user to map an attribute from one protocol to an attribute of another protocol. Configuration tool 162 shown in FIG. 1B may be configured to drive such an association process. The configuration tool 162 may be served to clients (local or remote) via web services 158 and/or GUI engine 160 (both shown in FIG. 1B). The configuration tool 162 may be provided as a thin web client (e.g., that primarily interfaces with web services 158) or a thick client (e.g., that only occasionally draws upon web services 158 and/or GUI engine 160). Configuration tool 162 may be configured to use a W3C standard intended to harmonize semantic information from different systems to controllably define, describe and store relationships between the data/protocols (e.g., define the modules 208-220). For example, the W3C standard used may be the Web Ontology Language (OWL). In some exemplary embodiments, configuration tool 162 may be configured to prepare the message format and content normalization component 202 (and device/protocol modules 208-220 thereof) for machine level interoperability of data content.

Once the building subsystem integration layer 118 is configured, developers of applications may be provided with a software development kit to allow rapid development of applications compatible with the smart building manager (e.g., with an application-facing protocol or API of the building subsystem integration layer). Such an API or application-facing protocol may be exposed at the enterprise integration layer 108 shown in FIGS. 1A and 1B. In various exemplary embodiments, the smart building manager 106 including building subsystem integration layer 118 includes the following features or advantages: seamless in that heterogeneous applications and subsystems may be integrated without varying or affecting the behavior of the external facing interfaces or logic; open in that it allows venders to develop products and applications by coding adapters (e.g. modules 208-220 shown in FIG. 2) or features according to a well-defined specification; multi-standard in that it supports subsystems that operate according to standards as well as proprietary protocols; extensible in that it accommodates new applications and subsystems with little to no modification; scalable in that it supports many applications and subsystems, adaptable in that it allows for the addition or deletion of applications or subsystems without affecting system consistency; user-configurable in that it is adjustable to changes in the business environment, business rules, or business workflows; and secure in that it protects information transferred through the integration channel. Additional details with respect to building subsystem integration layer 118 are described below with respect to FIG. 3.

Integrated Control Layer

Referring further to FIGS. 1A and 1B, the integrated control layer 116 is configured to use the data input and/or output of the building subsystem integration layer 118 to make control decisions. Due to the subsystem integration provided by the building subsystem integration layer 118, the integrated control layer 116 can integrate control activities of the subsystems 128 such that the subsystems 128 behave as a single integrated supersystem. In an exemplary embodiment the integrated control layer 116 includes control logic that uses inputs and outputs from a plurality of building subsystems to provide greater comfort and energy savings relative to the comfort and energy savings that separate subsystems could provide alone. For example, information from a first building subsystem may be used to control a second building subsystem. By way of a more particular example, when a building employee badges in at a parking garage, a message may be sent from the parking subsystem to the building subsystem integration layer 118, converted into an event recognized as a universal occupancy (e.g., "badge-in") event and provided to integrated control layer 116. Integrated control layer 116 may include logic that turns on the lights in the building employee's office, begins cooling the building employee's office in response to the anticipated occupancy, and boots up the employee's computer. The decision to turn the devices on is made by integrated control layer 116 and integrated control layer 116 may cause proper "on" commands to be forwarded to the particular subsystems (e.g., the lighting subsystem, the IT subsystem, the HVAC subsystem). The integrated control layer 116 passes the "on" commands through building subsystem integration layer 118 so that the messages are properly formatted or protocolled for receipt and action by the subsystems. As is illustrated in FIGS. 1A-B, the integrated control layer 116 is logically above the building subsystems and building subsystem controllers. The integrated control layer 116, by having access to information from multiple systems, is configured to use inputs from one or more building subsystems 128 to make control decisions for control algorithms of other building subsystems. For example, the "badge-in" event described above can be used by the integrated control layer 116 (e.g., a control algorithm thereof) to provide new setpoints to an HVAC control algorithm of the HVAC subsystem.

While conventional building subsystem controllers are only able to process inputs that are directly relevant to the performance of their own control loops, the integrated control layer 116 is configured to use an input from a first subsystem to make an energy-saving control decision for a second subsystem. Results of these decisions can be communicated back to the building subsystem integration layer 116 via, for example, the message format and content normalization component 202 shown in FIG. 2A. Therefore, advantageously, regardless of the particular HVAC system or systems connected to the smart building manager, and due to the normalization at the building subsystem integration layer 118, the integrated control layer's control algorithms can determine a control strategy using normalized temperature inputs, and provide an output including a normalized setpoint temperature to the building subsystem integration layer. The building subsystem integration layer 118 can translate the normalized setpoint temperature into a command specific to the building subsystem or controller for which the setpoint adjustment is intended. If multiple subsystems are utilized to complete the same function (e.g., if multiple disparately protocolled HVAC subsystems are provided in different regions of a building), the building subsystem integration layer 118 can convert a command decision (e.g., to lower the temperature setpoint by 2 degrees) to multiple different commands for receipt and action by the multiple disparately protocolled HVAC subsystems. In this way, functions of the integrated control layer 116 may be executed using the capabilities of building subsystem integration layer 118. In an exemplary embodiment, the integrated control layer is configured to conduct the primary monitoring of system and subsystem statuses and interrelationships for the building. Such monitoring can cross the major energy consuming subsystems of a building to allow for cross-subsystem energy savings to be achieved (e.g., by the demand response layer 112).

The integrated control layer 116 is shown to be logically below the demand response layer 112. The integrated control layer 116 is configured to enhance the effectiveness of the demand response layer 112 by enabling building subsystems 128 and their respective control loops to be controlled in coordination with the demand response layer 112. This configuration may advantageously provide much less disruptive demand response behavior than conventional systems. For example, the integrated control layer 116 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller. The integrated control layer 116 may also be configured to provide feedback to the demand response layer 112 so that the demand response layer 112 may check that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. The integrated control layer 116 is also logically below the fault detection and diagnostics layer 114 and the automated measurement and validation layer 110. The integrated control layer may be configured to provide calculated inputs (e.g., aggregations) to these "higher levels" based on outputs from more than one building subsystem.

Control activities that may be completed by the integrated control layer 116 (e.g., software modules or control algorithms thereof) include occupancy-based control activities. Security systems such as radio frequency location systems (RFLS), access control systems, and video surveillance systems can provide detailed occupancy information to the integrated control layer 116 and other building subsystems 128 via the smart building manager 106 (and more particularly, via the building subsystem integration layer 118). Integration of an access control subsystem and a security subsystem for a building may provide detailed occupancy data for consumption by the integrated control layer 116 (e.g., beyond binary "occupied" or "unoccupied" data available to some conventional HVAC systems that rely on, for example, a motion sensor). For example, the exact number of occupants in the building (or building zone, floor, conference room, etc.) may be provided to the integrated control layer 116 or aggregated by the integrated control layer 116 using inputs from a plurality of subsystems. The exact number of occupants in the building can be used by the integrated control layer 116 to determine and command appropriate adjustments for building subsystems 128 (such as HVAC subsystem 140 or lighting subsystem 142). Integrated control layer 116 may be configured to use the number of occupants, for example, to determine how many of the available elevators to activate in a building. If the building is only 20% occupied, the integrated control layer 116, for example, may be configured to power down 80% of the available elevators for energy savings. Further, occupancy data may be associated with individual workspaces (e.g., cubicles, offices, desks, workstations, etc.) and if a workspace is determined to be unoccupied by the integrated control layer, a control algorithm of the integrated control layer 116 may allow for the energy using devices serving the workspace to be turned off or commanded to enter a low power mode. For example, workspace plug-loads, task lighting, computers, and even phone circuits may be affected based on a determination by the integrated control layer that the employee associated with the workspace is on vacation (e.g., using data inputs received from a human-resources subsystem). Significant electrical loads may be shed by the integrated control layer 116, including, for example, heating and humidification loads, cooling and dehumidification loads, ventilation and fan loads, electric lighting and plug loads (e.g. with secondary thermal loads), electric elevator loads, and the like. The integrated control layer 116 may further be configured to integrate an HVAC subsystem or a lighting subsystem with sunlight shading devices or other "smart window" technologies. Natural day-lighting can significantly offset lighting loads but for optimal comfort may be controlled by the integrated control layer to prevent glare or over-lighting. Conversely, shading devices and smart windows may also be controlled by the integrated control layer 116 to calculably reduce solar heat gains in a building space—which can have a significant impact on cooling loads. Using feedback from sensors in the space, and with knowledge of the HVAC control strategy, the integrated control layer 116 may further be configured to control the transmission of infrared radiation into the building, minimizing thermal transmission when the HVAC subsystem is cooling and maximizing thermal transmission when the HVAC subsystem is heating. As a further example of an occupancy-based control strategy that may be implemented by the integrated control layer 116, inputs from a video security subsystem may be analyzed by a control algorithm of the integrated control layer 116 to make a determination regarding occupancy of a building space. Using the determination, the control algorithm may turn off the lights, adjust HVAC set points, power-down ICT devices serving the space, reduce ventilation, and the like—enabling energy savings with an acceptable loss of comfort to occupants of the building space.

Figure 3:
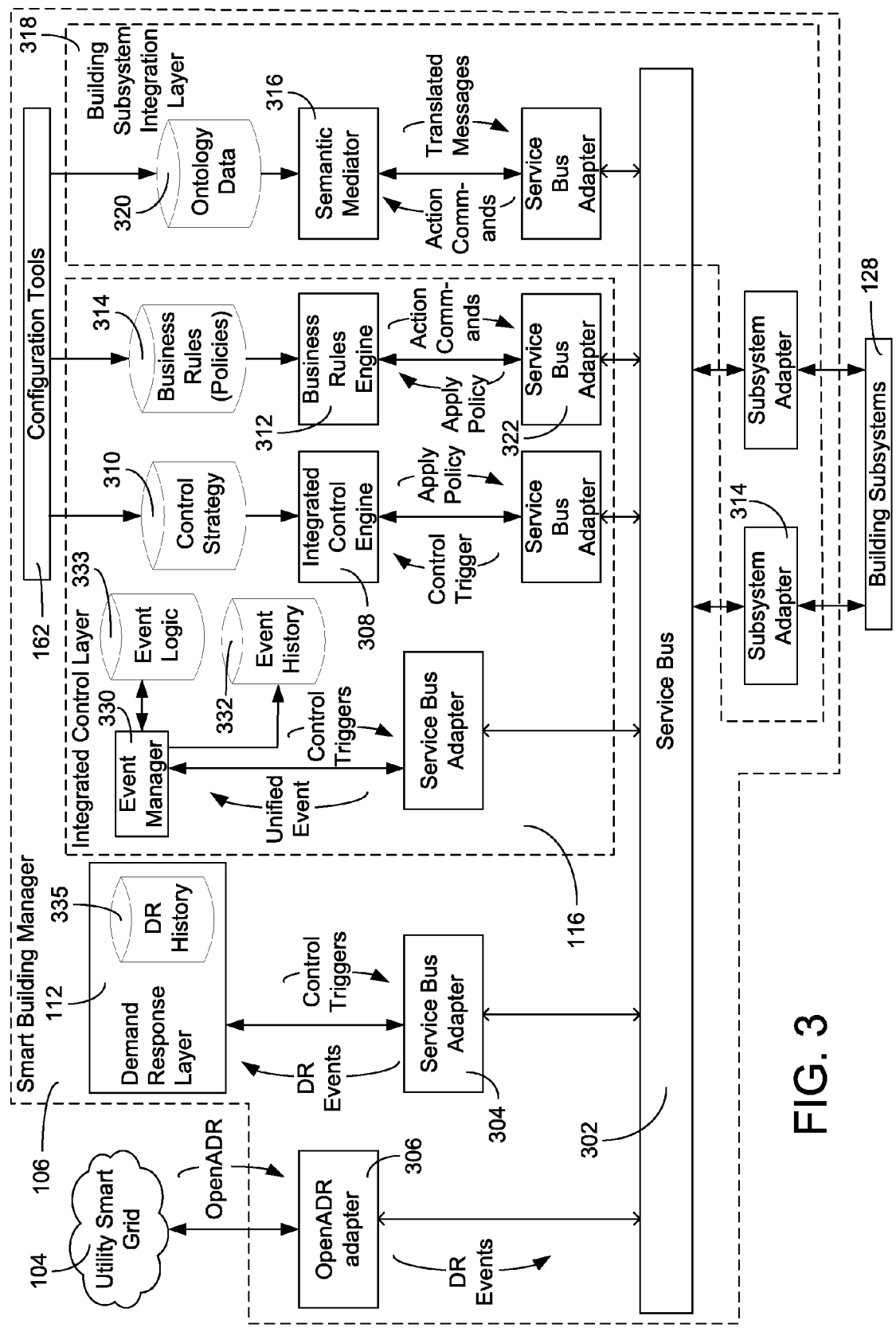
FIG. 3 is a detailed diagram of a portion of a smart building manager as shown in FIGS. 1A and 1B, according to an exemplary embodiment.

Referring now to FIG. 3, a detailed diagram of a portion of smart building manager 106 is shown, according to an exemplary embodiment. In particular, FIG. 3 illustrates a detailed embodiment of integrated control layer 116. Configuration tools 162 can allow a user to define (e.g., via graphical user interfaces, via prompt-driven "wizards", etc.) how the integrated control layer 116 should react to changing conditions in the building subsystems 128. In an exemplary embodiment configuration tools 162 allow a user to build and store condition-response scenarios that can cross multiple building subsystems and multiple enterprise control applications (e.g., work order management system applications, entity resource planning (ERP) applications, etc.).

Building subsystems 128, external sources such as smart grid 104, and internal layers such as demand response layer 112 can regularly generate events (e.g., messages, alarms, changed values, etc.) and provide the events to integrated control layer 116 or another layer configured to handle the particular event. For example, demand response (DR) events (e.g., a change in real time energy pricing) may be provided to smart building manager 106 as Open Automated Demand Response ("OpenADR") messages (a protocol developed by Lawrence Berkeley National Laboratories). The DR messages may be received by OpenADR adapter 306 (which may be a part of enterprise application layer 108 shown in FIGS. 1A and 1B). The OpenADR adapter 306 may be configured to convert the OpenADR message into a DR event configured to be understood (e.g., parsed, interpreted, processed, etc.) by demand response layer 112. The DR event may be formatted and transmitted according to or via a service bus 302 for the smart building manager 106.

Service bus adapter 304 may be configured to "trap" or otherwise receive the DR event on the service bus 302 and forward the DR event on to demand response layer 112. Service bus adapter 304 may be configured to queue, mediate, or otherwise manage demand response messages for demand response layer 112. Once a DR event is received by demand response layer 112, logic thereof can generate a control trigger in response to processing the DR event. The integrated control engine 308 of integrated control layer 116 is configured to parse the received control trigger to determine if a control strategy exists in control strategy database 310 that corresponds to the received control trigger. If a control strategy exists, integrated control engine 308 executes the stored control strategy for the control trigger. In some cases the output of the integrated control engine 308 will be an "apply policy" message for business rules engine 312 to process.

Business rules engine 312 may process an "apply policy" message by looking up the policy in business rules database 314. A policy in business rules database 314 may take the form of a set of action commands for sending to building subsystems 128. The set of action commands may include ordering or scripting for conducting the action commands at the correct timing, ordering, or with other particular parameters. When business rules engine 312 processes the set of action commands, therefore, it can control the ordering, scripting, and other parameters of action commands transmitted to the building subsystems 128.

Action commands may be commands for relatively direct consumption by building subsystems 128, commands for other applications to process, or relatively abstract cross-subsystem commands. Commands for relatively direct consumption by building subsystems 128 can be passed through service bus adapter 322 to service bus 302 and to a subsystem adapter 314 for providing to a building subsystem in a format particular to the building subsystem. Commands for other applications to process may include commands for a user interface application to request feedback from a user, a command to generate a work order via a computerized maintenance management system (CMMS) application, a command to generate a change in an ERP application, or other application level commands.

More abstract cross-subsystem commands may be passed to a semantic mediator 316 which performs the task of translating those actions to the specific commands required by the various building subsystems 128. For example, a policy might contain an abstract action to "set lighting zone X to maximum light." The semantic mediator 316 may translate this action to a first command such as "set level to 100% for lighting object O in controller C" and a second command of "set lights to on in controller Z, zone_id_no 3141593." In this example both lighting object O in controller C and zone_id_no 3141593 in controller Z may affect lighting in zone X. Controller C may be a dimming controller for accent lighting while controller Z may be a non-dimming controller for the primary lighting in the room. The semantic mediator 316 is configured to determine the controllers that relate to zone X using ontology database 320. Ontology database 320 stores a representation or representations of relationships (the ontology) between building spaces and subsystem elements and subsystems elements and concepts of the integrated building supersystem. Using the ontology stored in ontology database 320, the semantic mediator can also determine that controller C is dimming and requires a numerical percentage parameter while controller Z is not dimming and requires only an on or off command. Configuration tool 162 can allow a user to build the ontology of ontology database 320 by establishing relationships between subsystems, building spaces, input/output points, or other concepts/objects of the building subsystems and the building space.

Events other than those received via OpenADR adapter 306, demand response layer 112, or any other specific event-handing mechanism can be trapped by subsystem adapter 314 (a part of building integration subsystem layer 318) and provided to a general event manager 330 via service bus 302 and a service bus adapter. By the time an event from a building subsystem 128 is received by event manager 330, it may have been converted into a unified event (i.e., "common event," "standardized event", etc.) by subsystem adapter 314 and/or other components of building subsystem integration layer 318 such as semantic mediator 316. The event manager 330 can utilize an event logic DB to lookup control triggers, control trigger scripts, or control trigger sequences based on received unified events. Event manager 330 can provide control triggers to integrated control engine 308 as described above with respect to demand response layer 112. As events are received they may be archived in event history 332 by event manager 330. Similarly, demand response layer 112 can store DR events in DR history 335. One or both of event manager 330 and demand response layer 112 may be configured to wait until multi-event conditions are met (e.g., by processing data in history as new events are received). For example, demand response layer 112 may include logic that does not act to reduce energy loads until a series of two sequential energy price increases are received. In an exemplary embodiment event manager 330 may be configured to receive time events (e.g., from a calendaring system). Different time events can be associated with different triggers in event logic database 333.

In an exemplary embodiment the configuration tools 162 can be used to build event conditions or trigger conditions in event logic 333 or control strategy database 310. For example, the configuration tools 162 can provide the user with the ability to combine data (e.g., from subsystems, from event histories) using a variety of conditional logic. In varying exemplary embodiments the conditional logic can range from simple logical operators between conditions (e.g., AND, OR, XOR, etc.) to pseudo-code constructs or complex programming language functions (allowing for more complex interactions, conditional statements, loops, etc.). The configuration tools 162 can present user interfaces for building such conditional logic. The user interfaces may allow users to define policies and responses graphically. In some embodiments the user interfaces may allow a user to select a pre-stored or pre-constructed policy and adapt it or enable it for use with their system.

Referring still to FIG. 3, in some embodiments integrated control layer 116 generally and integrated control engine 308 can operate as a "service" that can be used by higher level layers of smart building manager 106, enterprise applications, or subsystem logic whenever a policy or sequence of actions based on the occurrence of a condition is to be performed. In such embodiments control operations do not need to be reprogrammed—applications or logic can rely on the integrated control layer 116 to receive an event and to execute the related subsystem functions. For example, demand response layer 112, fault detection and diagnostics layer 114 (shown in FIGS. 1A and 1B), enterprise integration 108, and applications 120, 124 may all utilize a shared control strategy 310 and integrated control engine 308 in initiate response sequences to events.

Fault Detection and Diagnostics Layer

Figure 4:
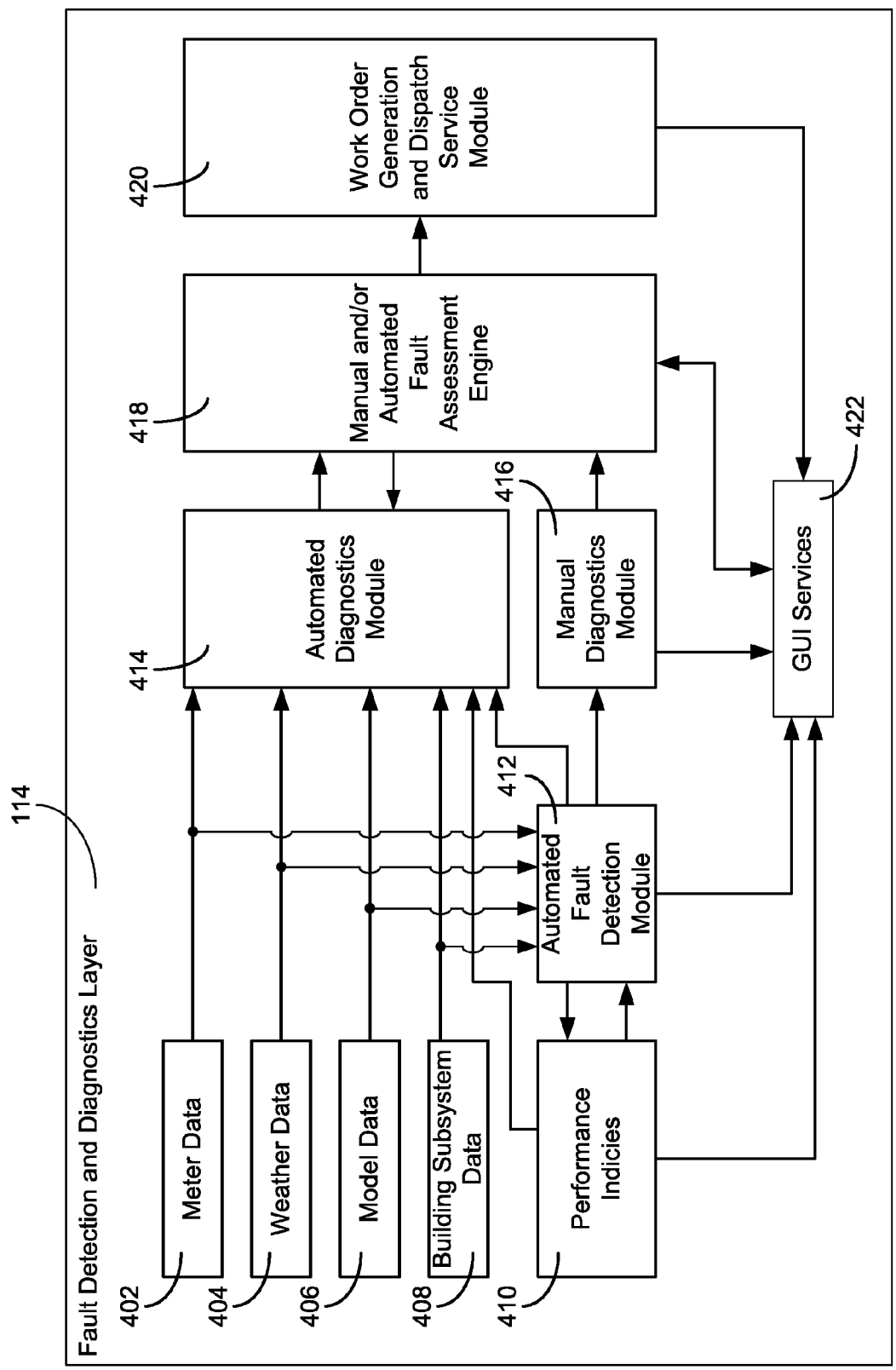
FIG. 4 is a detailed diagram of a fault detection and diagnostics layer as shown in FIGS. 1A and 1B, according to an exemplary embodiment.

Referring now to FIG. 4, the fault detection and diagnostics (FDD) layer 114 is shown in greater detail, according to an exemplary embodiment. Fault detection and diagnostics (FDD) layer 114 is configured to provide on-going fault detection of building subsystems, building subsystem devices, and control algorithms of the integrated control layer. The FDD layer 114 may receive its inputs from the integrated control layer, directly from one or more building subsystems or devices, or from the smart grid. The FDD layer 114 may automatically diagnose and respond to detected faults. The responses to detected or diagnosed faults may include providing an alert message to a user, a maintenance scheduling system, or a control algorithm configured to attempt to repair the fault or to work-around the fault. In other exemplary embodiments FDD layer 114 is configured to provide "fault" events to integrated control layer as described with reference to FIG. 3 and the integrated control layer of FIG. 3 is configured to execute control strategies and policies in response to the received fault events. According to an exemplary embodiment, the FDD layer 114 (or a policy executed by an integrated control engine or business rules engine) may shut-down systems or direct control activities around faulty devices or systems to reduce energy waste, extend equipment life, or assure proper control response. The FDD layer 114 may be configured to use statistical analysis of near real-time and/or historical building subsystem data to rapidly identify faults in equipment operation.

As shown in FIG. 4, the FDD layer 114 is configured to store or access a variety of different system data stores (or data points for live data) 402-410. FDD layer 114 may use some content of data stores 402-410 to identify faults at the equipment level (e.g., specific chiller, specific AHU, specific terminal unit, etc.) and other content to identify faults at component or subsystem levels. The FDD layer 114 may be configured to output a specific identification of the faulty component or cause of the fault (e.g., loose damper linkage) using detailed subsystem inputs available at the building subsystem integration layer (shown in previous Figures). Such specificity and determinations may be calculated by the FDD layer 114 based on such subsystem inputs and, for example, Rule-based fault detection module 412. Rule-based fault detection module 412 can utilize a rule-based configuration to detect faults in the building management system. In some embodiments Rule-based fault detection module 412 more particularly is configured to calculate or update performance indices 410. Performance indices 410 may be calculated based on exponentially-weighted moving averages (EW-MAs) to provide statistical analysis features which allow outlier and statistical process control (SPC) techniques to be used to identify faults. For example, the FDD layer 114 may be configured to use meter data 402 outliers to detect when energy consumption becomes abnormal.

Once a fault is detected by the FDD layer 114 (e.g., by Rule-based fault detection module 412), the FDD layer 114 may be configured to generate one or more alarms or events to prompt manual fault diagnostics or to initiate an automatic fault diagnostics activity via automated diagnostics module 414. Automatic fault diagnostics module 414 may be configured to use meter data 402, weather data 404, model data 406 (e.g., performance models based on historical building equipment performance), building subsystem data 408, performance indices 410, or other data available at the building subsystem integration layer to complete its fault diagnostics activities.

In an exemplary embodiment, when a fault is detected, the automated diagnostics module 414 is configured to investigate the fault by initiating expanded data logging and error detection/diagnostics activities relative to the inputs, outputs, and systems related to the fault. For example, the automated diagnostics module 414 may be configured to poll sensors associated with an air handling unit (AHU) (e.g., temperature sensors for the space served by the AHU, air flow sensors, position sensors, etc.) on a frequent or more synchronized basis to better diagnose the source of a detected AHU fault.

Automated fault diagnostics module 414 may further be configured to compute residuals (differences between measured and expected values) for analysis to determine the fault source. For example, automated fault diagnostics module 414 may be configured to implement processing circuits or methods described in U.S. patent application Ser. No. 12/487,594, filed Jun. 18, 2009, titled "Systems and Methods for Fault Detection of Air Handling Units," the entirety of which is incorporated herein by reference. Automated fault diagnostics module 414 can use a finite state machine and input from system sensors (e.g., temperature sensors, air mass sensors, etc.) to diagnose faults. State transition frequency (e.g., between a heating state, a free cooling state, and a mechanical cooling state) may also be used by the Rule-based fault detection module 412 and/or the automated diagnostics module 414 to identify and diagnose unstable control issues. The FDD layer 114 may also or alternatively be configured for rule-based predictive detection and diagnostics (e.g., to determine rule thresholds, to provide for continuous monitoring and diagnostics of building equipment).

In addition to or as an alternative to an automated diagnostics process provided by automated diagnostics module 414, FDD layer 114 can drive a user through a manual diagnostic process using manual diagnostics module 416. One or both of automated diagnostics module 414 and manual diagnostics module 416 can store data regarding the fault and the diagnosis thereof for further assessment by manual and/or automated fault assessment engine 418. Any manually driven process of assessment engine 418 can utilize graphical or textual user interfaces displayed to a user to receive feedback or input from a user. In some embodiments assessment engine 418 will provide a number of possible reasons for a fault to the user via a GUI. The user may select one of the faults for manual investigation or calculation. Similarly, an automated process of assessment engine 418 may be configured to select the most probable cause for a fault based on diagnostics provided by modules 414 or 416. Once a cause is detected or estimated using assessment engine 418, a work order can be generated by work order generation and dispatch service 420. Work order generation and dispatch service can transmit the work order to a service management system and/or a work dispatch service 420 for action.

Further, data and processing results from modules 412, 414, 416, 418 or other data stored or modules of a fault detection and diagnostics layer can be provided to the enterprise integration layer shown in FIGS. 1A and 1B. Monitoring and reporting applications 120 can then access the data or be pushed the data so that real time "system health" dashboards can be viewed and navigated by a user (e.g., a building engineer). For example, monitoring and reporting applications 120 may include a web-based monitoring application that includes several graphical user interface (GUI) elements (e.g., widgets, dashboard controls, windows, etc.) for displaying key performance indicators (KPI) or other information to users of a GUI using FDD layer 114 information or analyses. In addition, the GUI elements may summarize relative energy use and intensity across different buildings (real or modeled), different campuses, or the like. Other GUI elements or reports may be generated and shown based on available data that allow facility managers to assess performance across a group of buildings from one screen. The user interface or report (or underlying data engine) may be configured to aggregate and categorize faults by building, building type, equipment type, fault type, times of occurrence, frequency of occurrence, severity, and the like. The GUI elements may include charts or histograms that allow the user to visually analyze the magnitude of occurrence of specific faults or equipment for a building, time frame, or other grouping. A "time series" pane of the GUI may allow users to diagnose a fault remotely by analyzing and comparing interval time-series data, trends, and patterns for various input/output points tracked/logged by the FDD layer 114. The FDD layer 114 may include one or more GUI servers or services 422 (e.g., a web service) to support such applications. Further, in some embodiments applications and GUI engines may be included outside of the FDD layer 114 (e.g., monitoring and reporting applications 120 shown in FIG. 1A, web services 158 shown in FIG. 1B, GUI engine 160 shown in FIG. 1B). The FDD layer 114 may be configured to maintain detailed historical databases (e.g., relational databases, XML databases, etc.) of relevant data and includes computer code modules that continuously, frequently, or infrequently query, aggregate, transform, search, or otherwise process the data maintained in the detailed databases. The FDD layer 114 may be configured to provide the results of any such processing to other databases, tables, XML files, or other data structures for further querying, calculation, or access by, for example, external monitoring and reporting applications.

In an exemplary embodiment the automated diagnostics module 414 automatically prioritizes detected faults. The prioritization may be conducted based on customer-defined criteria. The prioritization may be used by the manual or automated fault assessment module 418 to determine which faults to communicate to a human user via a dashboard or other GUI. Further, the prioritization can be used by the work order dispatch service to determine which faults are worthy of immediate investigation or which faults should be investigated during regular servicing rather than a special work request. The FDD layer 114 may be configured to determine the prioritization based on the expected financial impact of the fault. The fault assessment module 418 may retrieve fault information and compare the fault information to historical information. Using the comparison, the fault assessment module 418 may determine an increased energy consumption and use pricing information from the smart grid to calculate the cost over time (e.g., cost per day). Each fault in the system may be ranked according to cost or lost energy. The fault assessment module 418 may be configured to generate a report for supporting operational decisions and capital requests. The report may include the cost of allowing faults to persist, energy wasted due to the fault, potential cost to fix the fault (e.g., based on a service schedule), or other overall metrics such as overall subsystem or building reliability (e.g., compared to a benchmark). The fault assessment module 418 may further be configured to conduct equipment hierarchy-based suppression of faults (e.g., suppressed relative to a user interface, suppressed relative to further diagnostics, etc.). For such suppression, module 318 may use the hierarchical information available at, e.g., integrated control layer 116 or building subsystem integration layer 318 shown in FIG. 3. For example, module 318 may utilize building subsystem hierarchy information stored in ontology database 320 to suppress lower level faults in favor of a higher level fault (suppress faults for a particular temperature sensor and air handling unit in favor of a fault that communicates "Inspect HVAC Components Serving Conference Room 30").

FDD layer 114 may also receive inputs from lower level FDD processes. For example, FDD layer 114 may receive inputs from building subsystem supervisory controllers or field controllers having FDD features. In an exemplary embodiment FDD layer 114 may receive "FDD events," process the received FDD events, query the building subsystems for further information, or otherwise use the FDD events in an overall FDD scheme (e.g., prioritization and reporting). U.S. Pat. No. 6,223,544 (titled "INTEGRATED CONTROL AND FAULT DETECTION OF HVAC EQUIPMENT," issued May 1, 2001) (incorporated herein by reference) and U.S. Pub. No. 2009/0083583 (titled "FAULT DETECTION SYSTEMS AND METHODS FOR SELF-OPTIMIZING HEATING, VENTILATION, AND AIR CONDITIONING CONTROLS", filed Nov. 25, 2008, published Mar. 26, 2009) (incorporated herein by reference) may be referred to as examples of FDD systems and methods that may be implemented by FDD layer 114 (and/or lower level FDD processes for providing information to FDD layer 114).

Demand Response Layer

FIGS. 1A and 1B are further shown to include a demand response (DR) layer 112. The DR layer 112 is configured to optimize electrical demand in response to time-of-use prices, curtailment signals, or energy availability. Data regarding time-of-use prices, energy availability, and curtailment signals may be received from the smart grid 104, from energy providers and purchasers 102 (e.g., an energy aggregator) via the smart grid 104, from energy providers and purchasers 102 via a communication network apart from the smart grid, from distributed energy generation systems 122, from energy storage banks 126, or from other sources. According to an exemplary embodiment, the DR layer 112 includes control logic for responding to the data and signals it receives. These responses can include communicating with the control algorithms in the integrated control layer 116 to "load shed," changing control strategies, changing setpoints, or shutting down building devices or subsystems in a controlled manner. The architecture and process for supporting DR events is shown in and described with reference to FIG. 3. The DR layer 112 may also include control logic configured to determine when to utilize stored energy based on information from the smart grid and information from a local or remote energy storage system. For example, when the DR layer 112 receives a message indicating rising energy prices during a future "peak use" hour, the DR layer 112 can decide to begin using power from the energy storage system just prior to the beginning of the "peak use" hour.

In some exemplary embodiments the DR layer 112 may include a control module configured to actively initiate control actions (e.g., automatically changing setpoints) which minimize energy costs based on one or more inputs representative of or based on demand (e.g., price, a curtailment signal, a demand level, etc.). The DR layer 112 may further include or draw upon one or more DR policy definitions (e.g., databases, XML files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the DR policy definitions can specify which equipment may be turned on or off in response to particular demand inputs, how long a system or piece of equipment should be turned off, what setpoints can be changed, what the allowable set point adjustment range is, how long to hold a "high demand" setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.). One or more of the policies and control activities may be located within control strategy database 310 or business rules database 314. Further, as described above with reference to FIG. 3, some of the DR responses to events may be processed and completed by integrated control layer 116 with or without further inputs or processing by DR layer 112.

A plurality of market-based DR inputs and reliability based DR inputs may be configured (e.g., via the DR policy definitions or other system configuration mechanisms) for use by the DR layer 112. The smart building manager 106 may be configured (e.g., self-configured, manually configured, configured via DR policy definitions, etc.) to select, deselect or differently weigh varying inputs in the DR layer's calculation or execution of control strategies based on the inputs. DR layer 112 may automatically (and/or via the user configuration) calculate outputs or control strategies based on a balance of minimizing energy cost and maximizing comfort. Such balance may be adjusted (e.g., graphically, via rule sliders, etc.) by users of the smart building manager via a configuration utility or administration GUI.

The DR layer 112 may be configured to receive inputs from other layers (e.g., the building subsystem integration layer, the integrated control layer, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like from inside the system, from the smart grid 104, or from other remote sources.

Some embodiments of the DR layer 112 may utilize industry standard "open" protocols or emerging National Institute of Standards and Technology (NIST) standards to receive real-time pricing (RTP) or curtailment signals from utilities or power retailers. In other embodiments, proprietary protocols or other standards may be utilized. As mentioned above, in some exemplary embodiments, the DR layer 112 is configured to use the OpenADR protocol to receive curtailment signals or RTP data from utilities, other independent system operators (ISOs), or other smart grid sources. The DR layer 112, or another layer (e.g., the enterprise integration layer) that serves the DR layer 112 may be configured to use one or more security schemes or standards such as the Organization for the Advancement of Structured Information Standards (OASIS) Web Service Security Standards to provide for secure communications to/from the DR layer 112 and the smart grid 104 (e.g., a utility company's data communications network). If the utility does not use a standard protocol (e.g., the OpenADR protocol), the DR layer 112, the enterprise integration layer 108, or the building subsystem integration layer 118 may be configured to translate the utility's protocol into a format for use by the utility. The DR layer 112 may be configured to bi-directionally communicate with the smart grid 104 or energy providers and purchasers 102 (e.g., a utility, an energy retailer, a group of utilities, an energy broker, etc.) to exchange price information, demand information, curtailable load calculations (e.g., the amount of load calculated by the DR layer to be able to be shed without exceeding parameters defined by the system or user), load profile forecasts, and the like. DR layer 112 or an enterprise application 120, 124 in communication with the DR layer 112 may be configured to continuously monitor pricing data provided by utilities/ISOs across the nation, to parse the useful information from the monitored data, and to display the useful information to a user to or send the information to other systems or layers (e.g., integrated control layer 116).

The DR layer 112 may be configured to include one or more adjustable control algorithms in addition to or as an alternative from allowing the user creation of DR profiles. For example, one or more control algorithms may be automatically adjusted by the DR layer 112 using dynamic programming or model predictive control modules. In one embodiment business rules engine 312 is configured to respond to a DR event by adjusting a control algorithm or selecting a different control algorithm to use (e.g., for a lighting system, for an HVAC system, for a combination of multiple building subsystems, etc.).

The smart building manager 106 (e.g., using the demand response layer 112) can be configured to automatically (or with the help of a user) manage energy spend. The smart building manager 106 (with input from the user or operating using pre-configured business rules shown in FIG. 3) may be configured to accept time-of-use pricing signals or information from a smart grid (e.g., an energy provider, a smart meter, etc.) and, using its knowledge of historical building system data, control algorithms, calendar information, and/or weather information received from a remote source, may be configured to conduct automatic cost forecasting. The smart building manager 106 (e.g., the demand response layer 112) may automatically (or with user approval) take specific load shedding actions or control algorithm changes in response to different cost forecasts.

The smart building manager 106 may also be configured to monitor and control energy storage systems 126 (e.g., thermal, electrical, etc.) and distributed generation systems 122 (e.g., a solar array for the building, etc.). The smart building manager 106 or DR layer 112 may also be configured to model utility rates to make decisions for the system. All of the aforementioned processing activities or inputs may be used by the smart building manager 106 (and more particularly, a demand response layer 112 thereof) to limit, cap, profit-from, or otherwise manage the building or campus's energy spend. For example, using time-of-use pricing information for an upcoming hour that indicates an unusually high price per kilowatt hour, the system may use its control of a plurality of building systems to limit cost without too drastically impacting occupant comfort. To make such a decision and to conduct such activity, the smart building manager 106 may use data such as a relatively high load forecast for a building and information that energy storage levels or distributed energy levels are low. The smart building manager 106 may accordingly adjust or select a control strategy to reduce ventilation levels provided to unoccupied areas, reduce server load, raise a cooling setpoint throughout the building, reserve stored power for use during the expensive period of time, dim lights in occupied areas, turn off lights in unoccupied areas, and the like. In addition to The smart building manager 106 may provide yet other services to improve building or grid performance. For example, the smart building manager 106 may provide for expanded user-driven load control (allowing a building manager to shed loads at a high level of system/device granularity). The smart building manager 106 may also monitor and control power switching equipment to route power to/from the most efficient sources or destinations. The smart building manager 106 may communicate to the power switching equipment within the building or campus to conduct "smart" voltage regulation. For example, in the event of a brownout, the smart building manager 106 may prioritize branches of a building's internal power grid—tightly regulating and ensuring voltage to high priority equipment (e.g., communications equipment, data center equipment, cooling equipment for a clean room or chemical factory, etc.) while allowing voltage to lower priority equipment to dip or be cut off by the smart grid (e.g., the power provider). The smart building manager 106 or the DR layer 112 may plan these activities or proactively begin load shedding based on grid services capacity forecasting conducted by a source on the smart grid or by a local algorithm (e.g., an algorithm of the demand response layer). The smart building manager 106 or the DR layer 112 may further include control logic for purchasing energy, selling energy, or otherwise participating in a real-time or near real-time energy market or auction. For example, if energy is predicted to be expensive during a time when the DR layer 112 determines it can shed extra load or perhaps even enter a net-positive energy state using energy generated by solar arrays, or other energy sources of the building or campus, the DR layer 112 may offer units of energy during that period for sale back to the smart grid (e.g., directly to the utility, to another purchaser, in exchange for carbon credits, etc.).

In some exemplary embodiments, the DR layer 112 may also be configured to support a "Grid Aware" plug-in hybrid electric vehicle (PHEV)/electric vehicle charging system instead of (or in addition to) having the charging system in the vehicles be grid-aware. For example, in buildings that have vehicle charging stations (e.g., terminals in a parking lot for charging an electric or hybrid vehicle), the DR layer 112 can decide when to charge the vehicles (e.g., when to enable the charging stations, when to switch a relay providing power to the charging stations, etc.) based upon time, real time pricing (RTP) information from the smart grid, or other pricing, demand, or curtailment information from the smart grid. In other embodiments, each vehicle owner could set a policy that is communicated to the charging station and back to the DR layer 112 via wired or wireless communications that the DR layer 112 could be instructed to follow. The policy information could be provided to the DR layer 112 via an enterprise application 124, a vehicle information system, or a personal portal (e.g., a web site vehicle owner's are able to access to input, for example, at what price they would like to enable charging). The DR layer 112 could then activate the PHEV charging station based upon that policy unless a curtailment event is expected (or occurs) or unless the DR layer 112 otherwise determines that charging should not occur (e.g., decides that electrical storage should be conducted instead to help with upcoming anticipated peak demand). When such a decision is made, the DR layer 112 may pre-charge the vehicle or suspend charge to the vehicle (e.g., via a data command to the charging station). Vehicle charging may be restricted or turned off by the smart building manager during periods of high energy use or expensive energy. Further, during such periods, the smart building manager 106 or the DR layer 112 may be configured to cause energy to be drawn from plugged-in connected vehicles to supplement or to provide back-up power to grid energy.

Using the real time (or near real-time) detailed information regarding energy use in the building, the smart building manager 106 may maintain a greenhouse gas inventory, forecast renewable energy use, surpluses, deficits, and generation, and facilitate emission allocation, emission trading, and the like. Due to the detailed and real-time or near real-time nature of such calculations, the smart building manager 106 may include or be coupled to a micro-transaction emission trading platform.

The DR layer 112 may further be configured to facilitate the storage of on-site electrical or thermal storage and to controllably shift electrical loads from peak to off peak times using the stored electrical or thermal storage. The DR layer 112 may be configured to significantly shed loads during peak hours if, for example, high price or contracted curtailment signals are received, using the stored electrical or thermal storage and without significantly affecting building operation or comfort. The integrated control layer 116 may be configured to use a building pre-cooling algorithm in the night or morning and rely on calculated thermal storage characteristics for the building in order to reduce peak demand for cooling. Further, the integrated control layer 116 may be configured to use inputs such as utility rates, type of cooling equipment, occupancy schedule, building construction, climate conditions, upcoming weather events, and the like to make control decisions (e.g., the extent to which to pre-cool, etc.).

Automated Measurement & Verification Layer

FIGS. 1A and 1B are further shown to include an automated measurement and validation layer 110 configured to evaluate building system (and subsystem) performance. The automated measurement and validation (AM&V) layer 110 may implement various methods or standards of the international performance measurement and validation (IPMVP) protocol. In an exemplary embodiment, the AM&V layer 110 is configured to automatically (e.g., using data aggregated by the AM&V layer 110, integrated control layer 116, building subsystem integration layer 118, FDD layer 114, or otherwise) verify the impact of the integrated control layer 116, the FDD layer 114, the DR layer 112, or other energy-saving strategies of the smart building manager 106. For example, the AM&V layer 110 may be used to validate energy savings obtained by capital intensive retrofit projects that are monitored or managed post retrofit by the smart building manager. The AM&V layer 110 may be configured to calculate, for example, a return on investment date, the money saved using pricing information available from utilities, and the like. The AM&V layer 110 may allow for user selection of the validation method(s) it uses. For example, the AM&V layer 110 may allow for the user to select IPMVP Option C which specifies a method for the direct comparison of monthly or daily energy use from a baseline model to actual data from the post-installation measurement period. IPMVP Option C, for example, may specify for adjustments to be made of the base-year energy model analysis to account for current year over base year changes in energy-governing factors such as weather, metering period, occupancy, or production volumes. The AM&V layer 110 may be configured to track (e.g., using received communications) the inputs for use by such a validation method at regular intervals and may be configured to make adjustments to an "adjusted baseline energy use" model against which to measure savings. The AM&V layer 110 may further allow for manual or automatic non-routine adjustments of factors such as changes to the facility size, building envelope, or major equipment. Algorithms according to IPMVP Option B or Option A may also or alternatively be used or included with the AM&V layer 110. IPMVP Option B and IPMVP Option A involve measuring or calculating energy use of a system in isolation before and after it is retrofitted. Using the building subsystem integration layer (or other layers of the BMS), relevant data may be stored and the AM&V layer 110 may be configured to track the parameters specified by IPMVP Option B or A for the computation of energy savings for a system in isolation (e.g., flow rates, temperatures, power for a chiller, etc.).

The AM&V layer 110 may further be configured to verify that control strategies commanded by, for example, the integrated control layer or the DR layer are working properly. Further, the AM&V layer 110 may be configured to verify that a building has fulfilled curtailment contract obligations. The AM&V layer 110 may further be configured as an independent verification source for the energy supply company (utility). One concern of the utility is that a conventional smart meter may be compromised to report less energy (or energy consumed at the wrong time). The AM&V layer 110 can be used to audit smart meter data (or other data used by the utility) by measuring energy consumption directly from the building subsystems or knowledge of building subsystem usage and comparing the measurement or knowledge to the metered consumption data. If there is a discrepancy, the AM&V layer may be configured to report the discrepancy directly to the utility. Because the AM&V layer may be continuously operational and automated (e.g., not based on a monthly or quarterly calculation), the AM&V layer may be configured to provide verification of impact (e.g., of demand signals) on a granular scale (e.g., hourly, daily, weekly, etc.). For example, the AM&V layer may be configured to support the validation of very short curtailment contracts (e.g., drop X kW/h over 20 minutes starting at 2:00 μm) acted upon by the DR layer 112. The DR layer 112 may track meter data to create a subhourly baseline model against which to measure load reductions. The model may be based on average load during a period of hours prior to the curtailment event, during the five prior uncontrolled days, or as specified by other contract requirements from a utility or curtailment service provider (e.g., broker). The calculations made by the AM&V layer 110 may be based on building system energy models and may be driven by a combination of stipulated and measured input parameters to estimate, calculate, apportion, and/or plan for load reductions resulting from the DR control activities.

The AM&V layer 110 may yet further be configured to calculate energy savings and peak demand reductions in accordance with standards, protocols, or best practices for enterprise accounting and reporting on greenhouse gas (GHG) emissions. An application may access data provided or calculated by the AM&V layer 110 to provide for web-based graphical user interfaces or reports. The data underlying the GUIs or reports may be checked by the AM&V layer 110 according to, for example, the GHG Protocol Corporate Accounting Standard and the GHG Protocol for Project Accounting. The AM&V layer 110 preferably consolidates data from all the potential sources of GHG emissions at a building or campus and calculates carbon credits, energy savings in dollars (or any other currency or unit of measure), makes adjustments to the calculations or outputs based on any numbers of standards or methods, and creates detailed accountings or inventories of GHG emissions or emission reductions for each building. Such calculations and outputs may allow the AM&V layer 110 to communicate with electronic trading platforms, contract partners, or other third parties in real time or near real time to facilitate, for example, carbon offset trading and the like.

The AM&V Layer 110 may be further configured to become a "smart electric meter" a or substitute for conventional electric meters. One reason the adoption rate of the "Smart Electric Grid" has conventionally been low is that the entire stock of installed electric meters needs to be replaced so that the meters will support Real Time Pricing (RTP) of energy and other data communications features. The AM&V layer 110 can collect interval-based electric meter data and store the data within the system. The AM&V layer 110 can also communicate with the utility to retrieve or otherwise receive Real Time Pricing (RTP) signals or other pricing information and associate the prices with the meter data. The utility can query this information from the smart building manager (e.g., the AM&V layer 110, the DR layer 112) at the end of a billing period and charge the customer using a RTP tariff or another mechanism. In this manner, the AM&V layer 110 can be used as a "Smart Electric Meter".

When the AM&V layer 110 is used in conjunction with the DR layer 112, building subsystem integration layer 118, and enterprise integration layer 108, the smart building manager 106 can be configured as an energy service portal (ESP). As an ESP, the smart building manager 106 may communicably or functionally connect the smart grid (e.g., energy supply company, utility, ISO, broker, etc.) network to the metering and energy management devices in a building (e.g., devices built into appliances such as dishwashers or other "smart" appliances). In other words, the smart building manager 106 may be configured to route messages to and from other data-aware (e.g., Real Time Pricing (RTP) aware, curtailment signal aware, pricing aware, etc.) devices and the energy supply company. In this configuration, building subsystems that are not RTP aware will be managed by the DR layer 112 while devices that are RTP aware can get signals directly from the utility. For example, if a vehicle (e.g., PHEV) is programmed to charge only when the price of electricity is below \$0.1/kWh, the PHEV can query the utility through the smart building manager and charge independently from the DR layer 112.

In an exemplary embodiment the AM&V layer described in U.S. Provisional Application No. 61/302,854, filed Feb. 9, 2010 can be used as AM&V layer 110 or a part thereof.

Enterprise Integration Layer

The enterprise integration layer 108 shown in FIG. 1A or FIG. 1B is configured to serve clients or local applications with information and services to support a variety of enterprise-level applications. The enterprise integration layer 108 may be configured to communicate (in real time or near real time) with the smart grid 104 and/or energy providers and purchasers 102. More particularly, in some embodiments the enterprise integration layer 108 may communicate with "smart meters," automated meter interfaces with utilities, carbon emission tracking and accounting systems, energy reporting systems, a building occupant interface, and traditional enterprise productivity applications (e.g., maintenance management systems, financial systems, workplace and supply chain management systems, etc.). The enterprise integration layer 108 may be configured to use protocols and methods as described above with respect to other layers or otherwise.

Building Occupant Interface

As indicated above, the enterprise integration layer 108 shown in FIG. 1B may be configured to exchange information with a building occupant interface application. In other exemplary embodiments the enterprise integration layer 108 serves the building occupant interface application to clients connecting to the enterprise integration layer 108, web services 158, and/or GUI engine 160. In yet other embodiments web services 158 may utilize GUI engine 160 for graphics rendering resources and enterprise integration layer 108 for data relating to the building occupant interface in order to provide the building occupant interface to client applications.

Communication and Security Features

Referring again to FIG. 3, the smart building manager may be configured to provide drivers for BACnet, LON, N2, Modbus, OPC, OBIX, MIG, SMTP, XML, Web services, and various other wireless communications protocols including Zigbee. These drivers may be implemented within or used by the service bus adapters or subsystem adapters. The service bus for the smart building manager may be configured to communicate using any number of smart grid communications standards. Such standards may be utilized for intra-manager communication as well as communication with a smart grid component (e.g., utility company, smart meter, etc.). For example, the smart building manager may be configured to use the ANSI C12.22/C12.19 protocol for some internal communications (e.g., DR events) as well as for communications with the smart grid. The service bus adapters and subsystem adapters convert received messages into a normalized messaging format for use on the service bus. In an exemplary embodiment the service bus is flexible, making use of IT-centric message queuing technologies (e.g., Open AMQ, MSMQ, and WebSphere MQ) to assure reliability, security, scalability, and performance. Service bus adapters enable layers and applications to communicate among one another and/or to the various in-building or external systems (e.g., via subsystem adapters). Stored communications rules may be used by the service bus adapters, subsystem adapters, or other components of the system to catch or correct communications failures. Communications and action-failure rules may also be configured for use by the action layers of the system. For example, the DR layer can check for whether an action requested or commanded by the DR layer has completed. If not, the DR layer can take a different action or a corrective action (e.g., turn off an alternate load, adjust additional setpoints, trigger a focused FDD activity, etc.) to ensure that DR needs are met. The smart building manager can also determine if someone has provided a DR override command to the system and take corrective action if available. If corrective action is unavailable, an appropriate message or warning may be sent to a DR partner (e.g., a utility co., an energy purchaser via the smart grid, etc.).

The smart building manager 106 may reside on (e.g., be connected to) an IP Ethernet network utilizing standard network infrastructure protocols and applications (e.g., DNS, DHCP, SNTP, SNMP, Active Directory, etc.) and can also be secured using IT security best practices for those standard network infrastructure protocols and applications. For example, in some embodiments the smart building manager may include or be installed "behind" infrastructure software or hardware such as firewalls or switches. Further, configurations in the smart building manager 106 can be used by the system to adjust the level of security of the smart building manager 106. For example, the smart building manager 106 (or particular components thereof) can be configured to allow its middle layers or other components to communicate only with each other, to communicate with a LAN, WAN, or Internet, to communicate with select devices having a building service, or to restrict communications with any of the above mentioned layers, components, data sources, networks, or devices. The smart building manager 106 may be configured to support a tiered network architecture approach to communications which may provide for some measure of security. Outward facing components are placed in a less secure "tier" of the network to act as a point of entry to/from the smart building manager 106. These outward facing components are minimized (e.g., a web server receives and handles all requests from client applications) which limits the number of ways the system can be accessed and provides an indirect communications route between external devices, applications, and networks and the internal layers or modules of the smart building manager 106. For example, "behind" the outward facing "first tier" may lie a more secure tier of the network that requires for authentication and authorization to occur at the first tier before functions of the more secure tier are accessed. The smart building manager 106 may be configured to include firewalls between such tiers or to define such tiers to protect databases or core components of the system from direct unauthorized access from outside networks.

In addition to including or implementing "infrastructure" type security measures as the type disclosed above, the smart building manager may be configured to include a communications security module configured to provide network message security between the smart building manager and an outside device or application. For example, if SOAP messaging over HTTP is used for communication at the enterprise integration layer, the SOAP messages may be concatenated to include an RC2 encrypted header containing authentication credentials. The authentication credentials may be checked by the receiving device (e.g., the smart building manager, the end application or device, etc.). In some embodiments the encrypted header may also contain information (e.g., bits) configured to identify whether the message was tampered with during transmission, has been spoofed, or is being "replayed" by an attacker. If a message does not conform to an expected format, or if any part of the authentication fails, the smart building manager may be configured to reject the message and any other unauthorized commands to the system. In some embodiments that use HTTP messages between the application and the smart building manager, the smart building manager may be configured to provide SSL for message content security (encryption) and/or Forms authentication for message authentication.

The smart building manager 106 may yet further include an access security module that requires any application to be authenticated with user credentials prior to logging into the system. The access security module may be configured to complete a secure authentication challenge, accomplished via a public or private key exchange (e.g., RSA keys) of a session key (e.g., an RC2 key), after a login with user credentials. The session key is used to encrypt the user credentials for the authentication challenge. After the authentication challenge, the session key is used to encrypt the security header of the messages. Once authenticated, user actions within the system are restricted by action-based authorizations and can be limited. For example, a user may be able to command and control HVAC points, but may not be able to command and control Fire and Security points. Furthermore, actions of a user within the smart building manager are written to memory via an audit trail engine, providing a record of the actions that were taken. The database component of the smart building manager 106 (e.g., for storing device information, DR profiles, configuration data, pricing information, or other data mentioned herein or otherwise) can be accessible via an SQL server that is a part of the building management server or located remotely from the smart building manager 106. For example, the database server component of the smart building manager 106 may be physically separated from other smart building manager components and located in a more secure tier of the network (e.g., behind another firewall). The smart building manager 106 may use SQL authentication for secure access to one or more of the aforementioned databases. Furthermore, in an exemplary embodiment the smart building manager can be configured to support the use of non-default instances of SQL and a non-default TCP port for SQL. The operating system of the smart building manager may be a Windows-based operating system.

Each smart building manager 106 may provide its own security and is not reliant on a central server to provide the security. Further, the same robustness of the smart building manager 106 that provides the ability to incorporate new building subsystem communications standards, modules, drivers and the like also allows it to incorporate new and changing security standards (e.g., for each module, at a higher level, etc.).

Multi-campus/Multi-Building Energy Management

The smart building manager 106 shown in the Figures may be configured to support multi-campus or multi-building energy management services. Each of a plurality of campuses can include a smart building manager configured to manage the building, IT, and energy resources of each campus. In such an example, the building subsystems shown, e.g, in FIGS. 1A and 1B may be a collection of building subsystems for multiple buildings in a campus. The smart building manager may be configured to bi-directionally communicate with on-site power generation systems (e.g., distributed power sources, related services, solar arrays, fuel cell arrays, diesel generators, combined heat and power (CHP) systems, etc.), plug-in hybrid electric vehicle (PHEV) systems, and energy storage systems (e.g., stationary energy storage, thermal energy storage, etc.). Data inputs from such sources may be used by the demand and response layer of the smart building manager to make demand or response decisions and to provide other ancillary services to a connected smart grid (e.g., utility, smart meter connected to a utility, etc.) in real time or near real time. For example, the smart building manager may communicate with smart meters associated with an energy utility and directly or indirectly with independent systems operators (ISOs) which may be regional power providers. Using these communications, and its inputs from devices of the campus, the smart building manager (e.g., the demand response layer) is configured to engage in "peak shaving," "load shedding," or "load balancing" programs which provide financial incentives for reducing power draw during certain days or times of day. The demand response layer or other control algorithms of the smart building manager (e.g., control algorithms of the integrated control layer) may be configured to use weather forecast information to make setpoint or load shedding decisions (e.g., so that comfort of buildings in the campus is not compromised). The smart building manager may be configured to use energy pricing information, campus energy use information, or other information to optimize business transactions (e.g., the purchase of energy from the smart grid, the sale of energy to the smart grid, the purchase or sale of carbon credits with energy providers and purchasers, etc.). The smart building manager is configured to use the decisions and processing of the demand response layer to affect control algorithms of the integrated control layer.

While FIG. 1B is shown as a tightly-coupled smart building manager 106, in some embodiments the processing circuit of FIG. 1B (including the layers/modules thereof) may be distributed to different servers that together form the smart building manager having the control features described herein. In embodiments where the smart building manager 106 is controlling an entire campus or set of campuses, one or more smart building managers may be layered to effect hierarchical control activities. For example, an enterprise level smart building manager may provide overall DR strategy decisions to a plurality of lower level smart building managers that process the strategy decisions (e.g., using the framework shown in FIG. 3) to effect change at an individual campus or building. By way of further example, the "integrated control layer" 116 and the "building system integration layer" 118 may be replicated for each building and stored within lower level smart building servers while a single enterprise level smart building manager may provide a single higher level layer such the DR layer. Such a DR layer can execute a campus-wide DR strategy by passing appropriate DR events to the separate lower level smart building mangers having integrated control layers and building system integration layers. Higher level servers may provide software interfaces (APIs) to the one or more lower level servers so that the one or more lower level servers can request information from the higher level server, provide commands to the higher level server, or otherwise communicate with the layers or data of the higher level server. The reverse is also true, APIs or other software interfaces of the lower level servers may be exposed for consumption by the higher level server. The software interfaces may be web services interfaces, relational database connections, or otherwise.

Rule-Based Fault Detection

Rule-based fault detection generally refers to using specified rules to define the normal operation of a system and can be used in a building management system to detect faults. Typically, these rules are evaluated in an if-then manner. For example, a rule may specify that a measured temperature is above a specified threshold during normal operation of the system. The rule can then be used to determine if a fault condition exists by comparing measured temperatures to the rule. If the measured temperature is below the rule's threshold, a fault condition may exist and appropriate action can be taken by the system.

Figure 5:
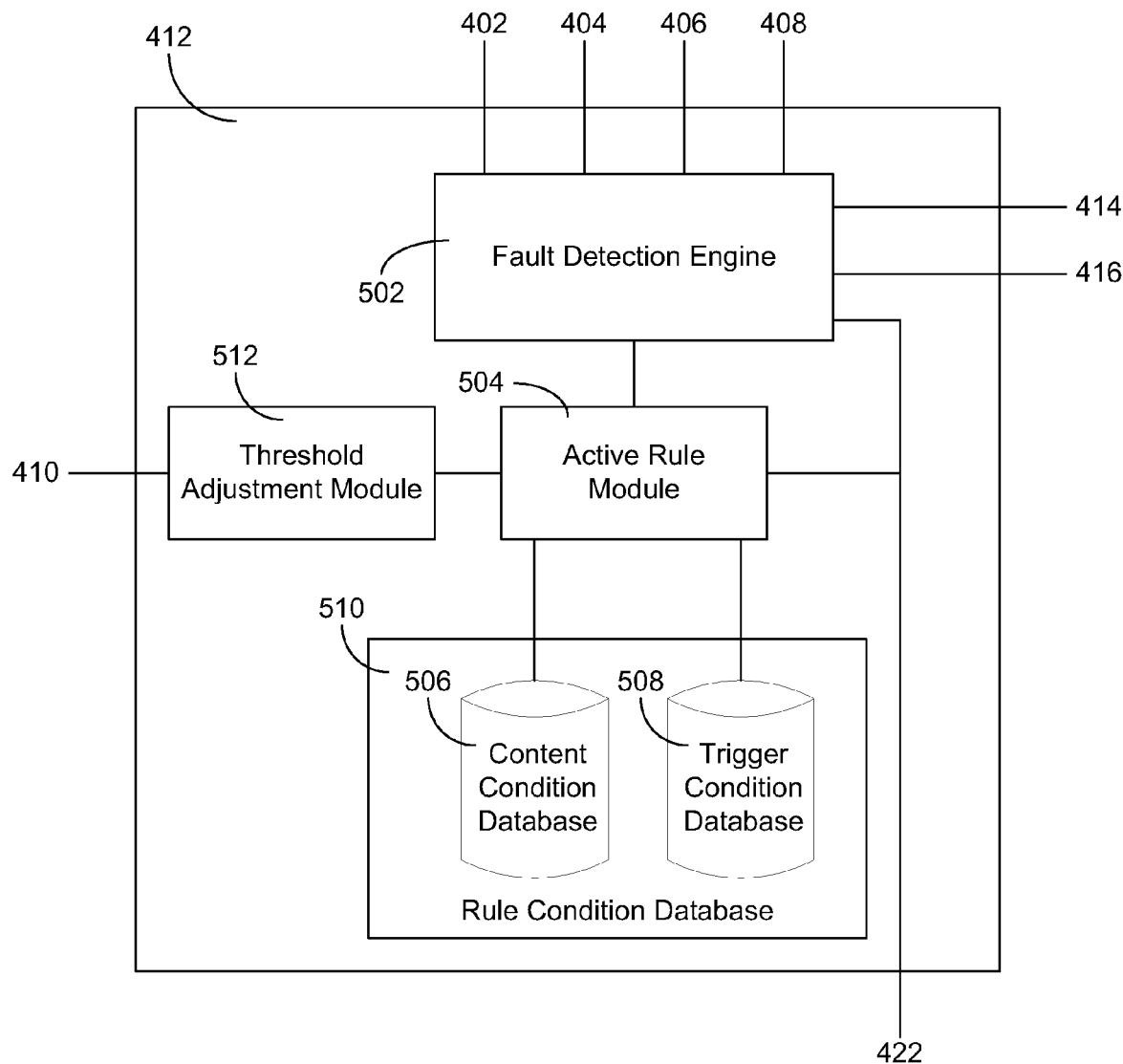
FIG. 5 is a detailed diagram of an automated fault detection module, according to an exemplary embodiment.

Referring now to FIG. 5, a detailed diagram of an automated fault detection module is shown, according to an exemplary embodiment. Automated fault detection module 412 includes fault detection engine 502, which is configured to provide rule-based fault detection for the building management system. In an exemplary embodiment, fault detection engine 502 may receive input data from the building management system including meter data 402, weather data 404, model data 406 and building subsystem data 408. Fault detection engine 502 compares the data from the building management system to a defined rule, in order to detect a fault. For example, building subsystem data 408 may include information about the position of a valve within HVAC subsystem 140. Fault detection engine 502 may apply the valve position information to a rule that determine whether the valve position is greater than 95%. If the rule conditions are met, fault detection engine 502 may output a fault. When a fault is detected, fault detection engine 502 may initiate diagnostics by notifying automated diagnostics module 414, manual diagnostics module 416 and/or GUI Services 422 of the fault.

Automated fault detection module 412 includes active rule module 504 which is configured to communicate active rules to fault detection engine 502. In an exemplary embodiment, active rule module 504 utilizes rule condition database 510 to construct rules or to recall information for processing rule conditions. Rule condition database 510 may be any storage mechanism capable of storing rule conditions, such as ROM, RAM, a relational database, flash memory, data structure, library file, etc. or another device. In an exemplary embodiment, rule condition database 510 may reside in a different location (e.g., on a different server) than active rule module 504 and may communicate with active rule module 504 across a network. In yet another embodiment, active rule module 504 may also comprise a database linking rule conditions in condition database 510 to particular parameters of the building management system, inputs outputs, thresholds, etc. or to data in other active rule modules. In another exemplary embodiment, active rule module 504 may reside in a remote location from fault detection engine 502 and communicate rules to fault detection engine 502 across a network.

The rule condition database 510 is shown to include a content condition database 506 and a trigger condition database 508. Content condition database 506 contains rule conditions that place conditions on data from the building management system. In some ways, content conditions may be any logical comparison between data from the building management system and a given value that can be used to detect faults. For example, data from the building management system may include a measured temperature, a power consumption, a performance metric, a position value, a fan speed, a damper output, etc. or any other type of data used by the building management system to control building equipment. Likewise, trigger condition database 508 includes rule conditions that may be used to further define when content conditions should be evaluated. For example, trigger condition database 508 may include rule conditions that evaluate an elapse of time, an operational state of a controller, a setpoint mode, or any other type of data that may indicate when a content condition should be evaluated. In this way, excess fault alarms may be avoided by using trigger conditions within a fault detection rule. For example, fault detection engine 502 may use a rule that checks the discharge air temperature of a piece of equipment in HVAC subsystem 140. In a startup condition, it may take a certain amount of time for the discharge air temperature to reach a setpoint. A rule may be used that comprises a trigger condition that first verifies that the controller is not in a startup operational state before evaluating a content condition that evaluates the temperature relative to a given threshold. In this way, fault alarms (e.g., excess alarms, false alarms) can be reduced during the startup period. Trigger conditions may also be used to prevent excess alarms caused by transient responses, self-correcting faults, fluctuations in values, or any other condition where evaluation of a content condition may or may not be necessary.

Active rule module 504 may also communicate with GUI services 422 to allow users to build active rules using trigger and content components stored within rule condition database 510. For example, a user may be presented with a list of trigger components and content components. A user may then build a rule by linking one or more trigger conditions with one or more content conditions. These links may be provided via text entry, a drag-and-drop action, or any other method of data entry that signifies an association between rule conditions. In one embodiment, these links are stored in active rule module 504 or in another memory for rule storage. In this way, system memory requirements are reduced, since rules using the same rule component need only link to the rule component instead of storing the rule component multiple times. Additionally, a user may also provide an indication that a rule is active, i.e. to be evaluated, or inactive. Constructed rules that are flagged as inactive may be retrieved at a later date and set to active and vice-versa.

Automated fault detection module 412 is shown to include threshold adjustment module 512. Thresholds for existing rules may be adjusted to reduce excess alarms. For example, HVAC subsystem 140 may include an operating mode that should hold a valve position at 100% open using a valve actuator. Valve actuator feedback is typically measured using a potentiometer on the valve actuator. Measurement errors may lead to a discrepancy between the measured position and the target position of 100%, although the valve is fully open. Therefore, a rule that verifies that the valve position is at 100% may cause a fault to be falsely detected. Threshold adjustment module 512 may be used to adjust the rule to have a new parameter value (e.g., 95%) that accomplishes the control goal but reduces the number of false fault alerts.

Rule Conditions

Figure 6A:
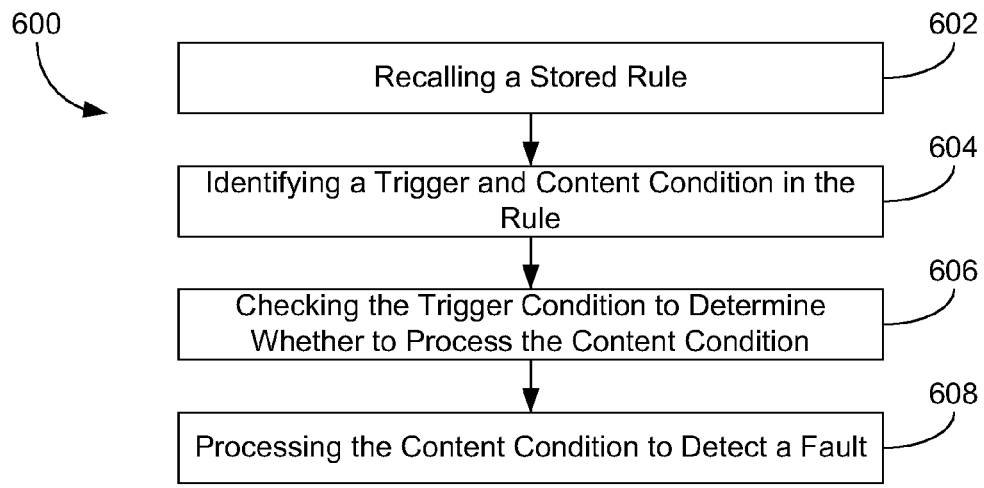
FIG. 6A is flow diagram of a fault detection strategy that utilizes a trigger condition and a content condition, according to an exemplary embodiment.

Referring now to FIG. 6A, a flow diagram of a fault detection strategy that utilizes a trigger condition and a content condition is shown, according to an exemplary embodiment. Fault detection strategy 600 includes step 602, wherein a stored rule is recalled. The stored rule may be recalled from flash memory, RAM, ROM, a data structure, a database, a file, or any other type of storage location capable of storing rule conditions. At step 604, a trigger condition and a content condition are identified within the rule. In an exemplary embodiment, the content condition relates to a parameter associated with the building management system while the trigger condition relates to a specified amount of time. For example, a rule may comprise a content condition that verifies that a damper opening is less than a specified value and a trigger condition that delays processing of the content condition for a specified amount of time. At step 606, the trigger condition is checked to determine whether to process the content condition. For example, the rule may have a content condition that verifies that a temperature value is above a given threshold and a trigger condition that delays processing of the content condition for an amount of time, such as the amount of time necessary for the system to startup. At step 608, the content condition is processed to detect a fault. In the preceding example, this would correspond to comparing the temperature value from a sensor to the threshold of the trigger condition. If the temperature is below the threshold, a fault is detected.

Figure 6B:
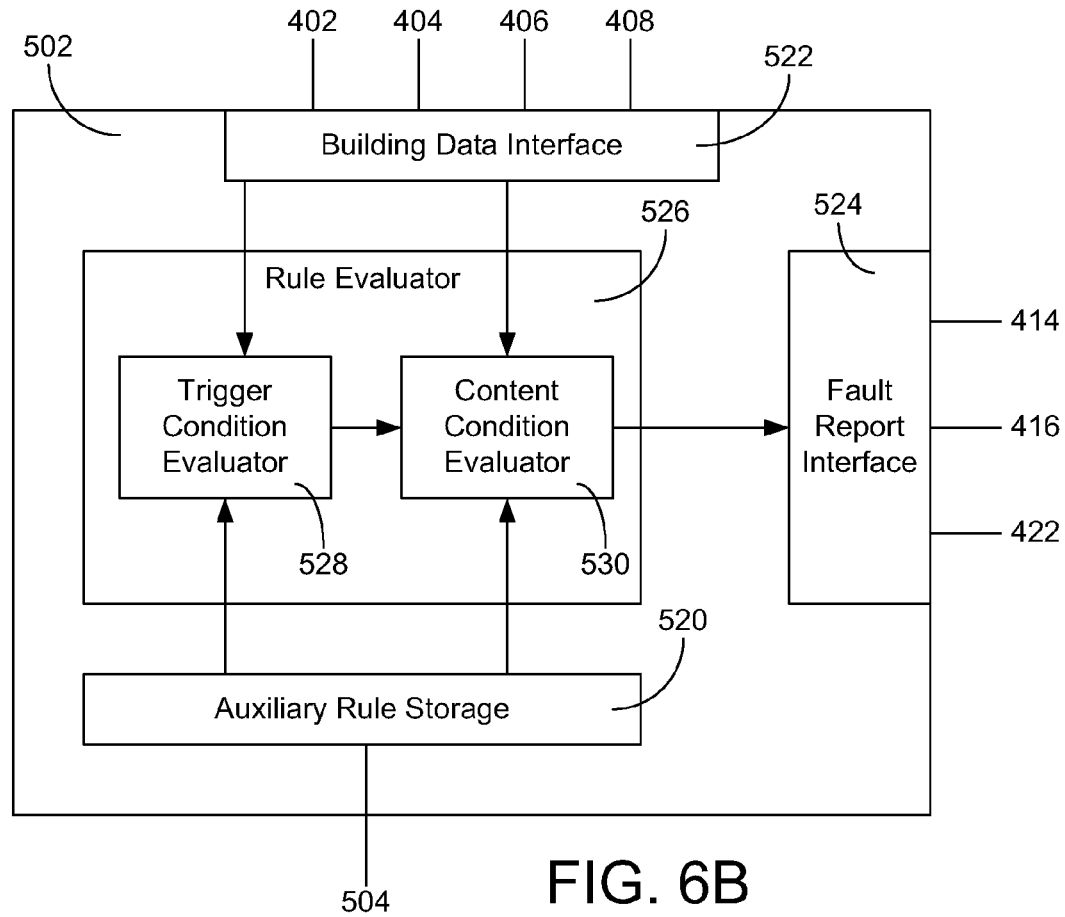
FIG. 6B is a detailed diagram of a fault detection engine as shown in FIG. 5, according to an exemplary embodiment.

Referring now to FIG. 6B, a detailed diagram of an automated fault detection engine is shown, according to an exemplary embodiment. Fault detection engine 502 may include auxiliary rule storage 520 to store fault detection rules. Auxiliary rule storage 520 may be any storage mechanism capable of storing fault detection rules, such as a ROM, RAM, relational database, flash memory, data structure, library file, etc. Rule storage 520 may be configured to act in an auxiliary capacity and receive and store rules generated by active rule module 504. For example, rule storage 520 may be used to store active rules local to fault detection engine 502, if active rule module 504 communicates with fault detection engine 502 over a network. In other embodiments, rule storage 520 is omitted and fault detection engine 502 directly uses the rules in active rule module 504. Fault detection engine 502 may also include a building data interface 522, which is configured to receive data from the building management system such as meter data 402, weather data 404, model data 406 and building subsystem data 408.

Fault detection engine 502 is also shown to include rule evaluator 526, which evaluates a rule stored in active rule module 504 or in rule storage 520. Rule evaluator 526 first identifies a trigger condition and one or more content conditions within the rule. Trigger condition evaluator 528 then determines if the trigger condition is met by comparing the trigger condition to building management data from building data interface 522 or to an internal value, such as a time count. If the trigger condition is met, content condition evaluator 530 then compares the one or more content conditions to the corresponding building management data from building data interface 522 to determine if a fault exists. In another exemplary embodiment, rule evaluator 526 may report a detected fault to a fault report interface 524, which can notify or provide information to automated diagnostics module 414, manual diagnostics module 416 and/or GUI Services 422.

Rule Threshold Adjustment

Figure 7A:
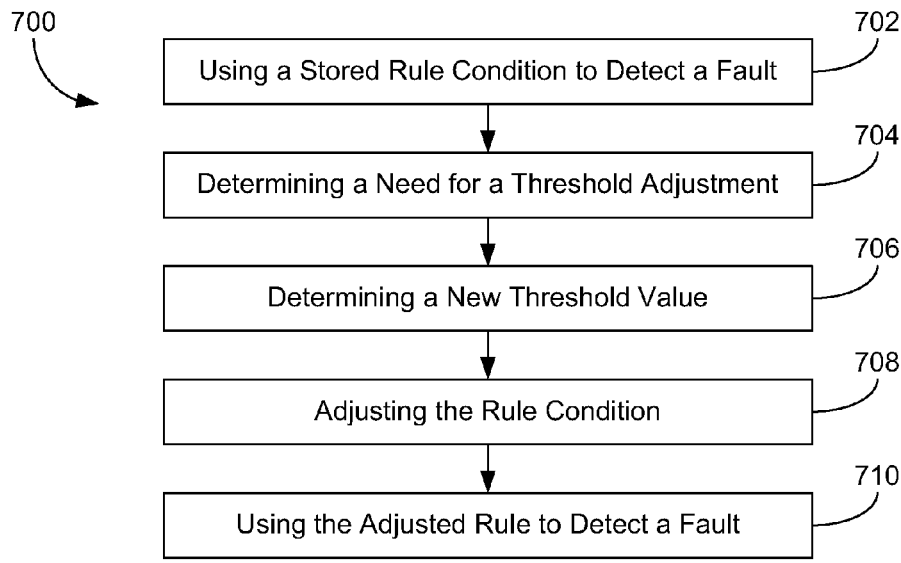
FIG. 7A is a flow diagram of a fault detection strategy that incorporates a threshold adjustment, according to an exemplary embodiment.

Referring now to FIG. 7A, a flow diagram of a fault detection strategy that incorporates a threshold adjustment is shown, according to an exemplary embodiment. Fault detection strategy 700 includes step 702, wherein a stored rule condition is used to detect a fault in the building management system. At step 704, a need for a threshold adjustment is determined. In one exemplary embodiment, this may be determined by a user and inputted into the system. For example, a technician may indicate to the system that an excess of alerts relate to a given sensor. In another exemplary embodiment, the need for a threshold adjustment may be determined automatically by the system. At step 706, a new threshold value for the rule is determined. In one exemplary embodiment, this can be provided to the system by a user. For example, a technician may know that a given sensor has an error rate greater than the current rule and provide this rate to the system. In another exemplary embodiment, the system can automatically determine a new threshold based on a financial impact of a detected fault, an error value associated with a controlled device, a transient response of a controlled device, a power consumption value, etc. or any other data used to detect faults. At step 708, the fault detection rule condition is adjusted to reflect the new threshold value. In one embodiment, this may be done manually by the user. In another exemplary embodiment, the system can automatically adjust the rule condition. At step 710, the adjusted rule is used to detect a fault in the building management system.

Figure 7B:
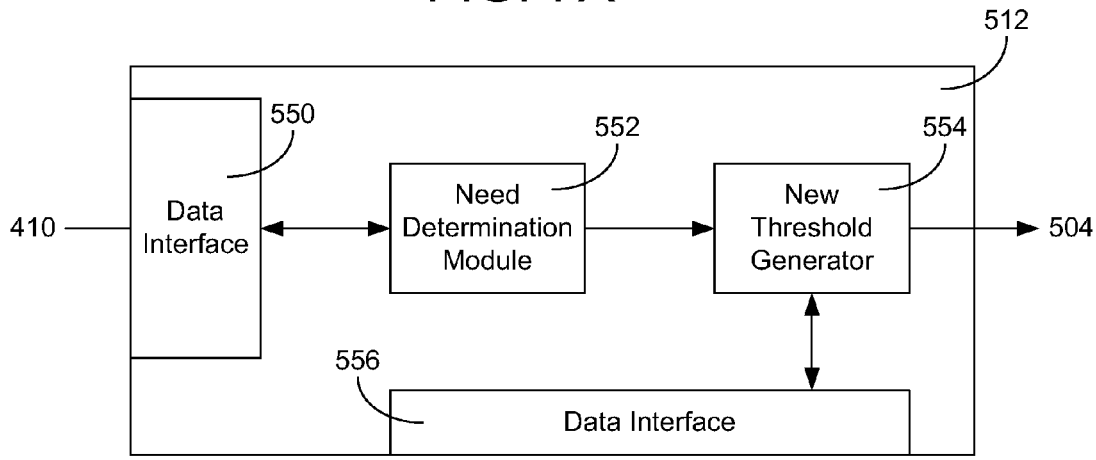
FIG. 7B is a detailed diagram of a threshold adjustment module as shown in FIG. 5, according to an exemplary embodiment.

Referring now to FIG. 7B, a detailed diagram of threshold adjustment module 512 is shown, according to an exemplary embodiment. In one exemplary embodiment, threshold adjustment module 512 may include data interface 550. Data interface 550 is configured to receive data that may indicate whether a threshold adjustment is necessary and to provide this data to need determination module 552. For example, data interface 550 may receive performance indices 410 from the building management system. In another embodiment, data interface 550 may utilize historical fault detection data or data from event history 332 shown in FIG. 3. For example, such data may be provided by fault detection engine 502, automated diagnostics module 414, manual diagnostics module 416, manual and/or automated fault assessment engine 418 or work order generation and dispatch service module 420, or another system or subsystem of the building management system. Historical fault detection data may indicate fault frequency, analyzed fault priority, faults that were detected and determined not to be actual faults, actual faults, or other fault information. In another embodiment, data interface 550 may utilize system performance data that indicates a decrease in network performance due to an increase in the number of fault alerts. In another exemplary embodiment, a user may manually indicate a need for a threshold adjustment. For example, a user may be notified via GUI services 422 that an alert is reported frequently. The user may then manually indicate (via a GUI input) that a threshold adjustment is needed.

Data interface 550 provides data to need determination module 552. In one exemplary embodiment, need determination module 552 utilizes the performance indices and/or historical fault detection data to automatically determine that a threshold adjustment is needed. For example, need determination module 552 may automatically determine that a frequent, low-priority alert requires a threshold adjustment to its corresponding fault detection rule. In other embodiments, need determination module 552 may use statistical analysis to automatically determine that a threshold adjustment is needed. In another embodiment, need determination module 552 utilizes data from a user which indicates that a threshold adjustment is necessary. A hybrid approach is also possible, where need determination module 552 automatically determines a need for a threshold adjustment and causes this determination to be presented to a user. A user may then either confirm or reject this determination.

When a threshold adjustment is necessary, need determination module 552 notifies new threshold generator 554. In an exemplary embodiment, new threshold generator 554 receives new threshold data from data interface 556. New threshold data can be any type of data needed to determine a new threshold for a fault detection rule. In one embodiment, new threshold data may be a financial impact of a detected fault. By way of example, a rule associated with equipment having a low financial impact were a fault to occur may have its threshold adjusted to reduce the number of alerts. In another embodiment, an estimated error value associated with a controlled device may be used to determine a new threshold. By way of example, a potentiometer may have an error value of 2% that causes excessive alerts. New threshold generator 554 can use this error value to generate a new threshold for the corresponding fault detection rule. In another embodiment, new threshold data may be an amount of time necessary for a controller and/or controlled device to reach a desired state. For example, new threshold generator 554 may generate a new threshold based on the amount of time needed for a controlled device to reach a steady state. In another example, the amount of time needed for a system to startup may be used to generate a new threshold. In yet another embodiment, new threshold data may be an estimated power consumption value of a controlled device. In one exemplary embodiment, new threshold generator 554 uses the new threshold data to automatically generate the new threshold. In another exemplary embodiment, new threshold data generator 554 may utilize GUI services 442 to prompt a user for manual entry of the new threshold. In yet another embodiment, a hybrid approach is taken where a new threshold is automatically determined and presented to a user for confirmation or manual entry of a different threshold. Once a new threshold has been determined, new threshold generator 554 updates the rule in active rule module 504 using the new threshold data.

Embedded Fault Detection Rules

Figure 8:
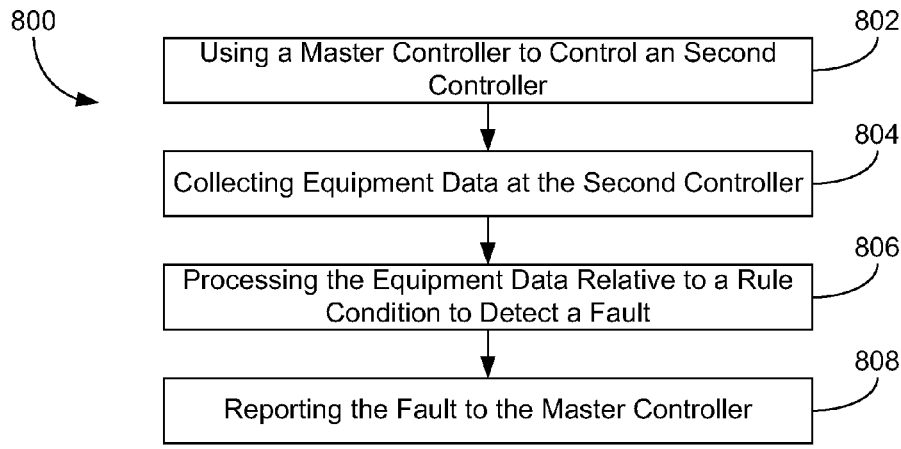
FIG. 8 is flow diagram of a fault detection strategy that employs fault detection rules on an equipment controller, according to an exemplary embodiment.

Referring now to FIG. 8, a flow diagram of a fault detection strategy that employs a fault detection rule on a second controller is shown, according to an exemplary embodiment. Fault detection strategy 800 includes step 802, wherein a master controller is used to control and/or supervise a second controller. In a preferred embodiment, the second controller is an equipment controller that provides direct control over building equipment. For example, a master controller may be used to provide a setpoint temperature to an AHU controller. In other embodiments, the second controller can be any of the lowest level controllers within the building management system. At step 804, equipment data is collected at the second controller. For example, the equipment data may be a measured temperature, a power consumption, a performance metric, a position value, a fan speed, a damper output, etc. or any other data associated with the controlled equipment. At step 806, the equipment data is processed relative to a rule condition to detect a fault in the equipment. For example, the rule condition may test to see if the measured temperature is above a specified value. In an exemplary embodiment, the rule condition may be selectively applied based on the operational state of the second controller itself. At step 808, the detected fault is reported to the master controller from the second controller.

Figure 9:
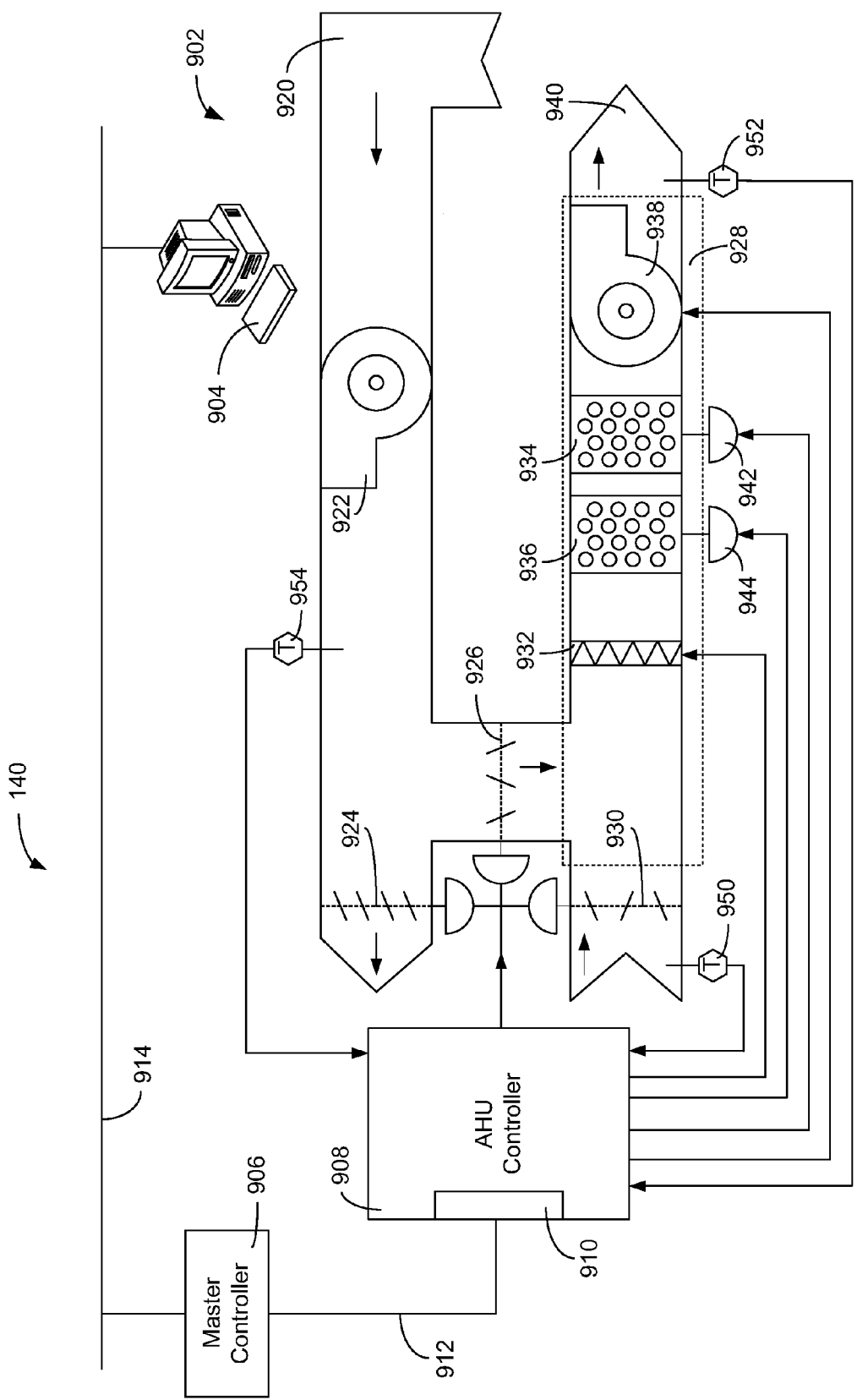
FIG. 9 is a detailed diagram of a heating, ventilation, and air conditioning subsystem as shown in FIGS. 1A and 1B, according to an exemplary embodiment.

Referring now to FIG. 9, a schematic diagram of an HVAC subsystem 140 including air handling unit (AHU) 902 is shown, according to an exemplary embodiment. HVAC subsystem 140 is used to affect a controlled variable of a building zone (e.g., a climate condition of the building zone, a temperature, an oxygen level, an air pollutant level, a humidity level, etc.). In addition to AHU 902, HVAC subsystem 140 includes a workstation 904, a master controller 906 (e.g., a network automation engine (NAE)), and an AHU controller 908. AHU controller 908 is coupled to master controller 906 via communications port 910 of AHU controller 908 and communications link 912 (e.g., a building network, a wireless network, a wired network, the same medium as link 912, etc.). Workstation 904 and master controller 906 are coupled via communications bus 914 (e.g., an in-building network, wireless network, an IP network, etc.). Communications bus 914 may be coupled to additional sections or additional controllers, as well as other components, utilized in HVAC subsystem 140. Master controller 906, a user interface (e.g., at a thermostat) or another device may provide a climate condition setpoint to controller 908. With this setpoint, AHU controller 908 may generally be configured to apply heating or cooling to cause a measurement of the climate condition to be near the setpoint.

The circuits and control logic described throughout this application may be implemented within AHU controller 908 or master controller 906. Further, some tasks or calculations may be conducted by one circuit or controller while other tasks or calculations are conducted by another circuit or controller. Accordingly, while many of the embodiments described herein refer to hardware and logic contained within a local AHU controller such as AHU controller 908, the teachings of the present application extend to providing similar hardware and logic in a master controller or another device.

Using AHU 902, air is returned from a building zone through return air duct 920 by being drawn in using return fan 922. Depending on the positions of exhaust damper 924 and recirculation damper 926, the return air may be exhausted outside the building zone or flow from return air duct 920 to mixed air plenum 928, becoming recirculated air. In mixed air plenum 928, fresh outdoor air, drawn through inlet damper 930, is mixed with recirculated air. The mixture passes through a filter 932, a heating coil 936, a cooling coil 934, and a supply fan 938. The temperatures and flow rates of the outdoor and recirculated air streams determine the conditions at the end of mixed air plenum 928. At most only one of the cooling and heating coils 934, 636 should be active at any given time if the control strategy for AHU 902 is implemented properly and there are no faults in AHU 902. After being conditioned by coils 934, 936, the air is distributed to a building zone or zones through supply air duct 940 as supply air.

Cooling coil 934, heating coil 936, and dampers 924, 926, 930 may be operated by AHU controller 908 having control logic which determines the proper combination of system components to activate for maintaining a supply air temperature at a desired value (e.g., a setpoint provided by a user or a supervisory controller). Controller 908 generally implements a control strategy that regulates the mixture of outdoor air with return air and controllably provides mechanical cooling or heating to the mixture of air via coils 934, 936. For example, controller 908 may control cooling coil valve 942 and heating coil valve 944 to change the amount of cooling or heating provided by the supply air output from supply air duct 940.

Controller 908 may receive sensor data from sensors 950, 952, 954 to use in determining the control strategy. An outdoor air temperature sensor 950 may provide controller 908 with a signal from which the temperature of the outdoor air entering AHU 902 can be derived. Supply air temperature sensor 952 provides controller 908 with a signal indicative of the temperature of the air being fed to supply air duct 940 and output for the building zone. Sensor 954 provides controller 908 with a signal indicative of the temperature of the air in return air duct 920 from the building zone.

Figure 10:
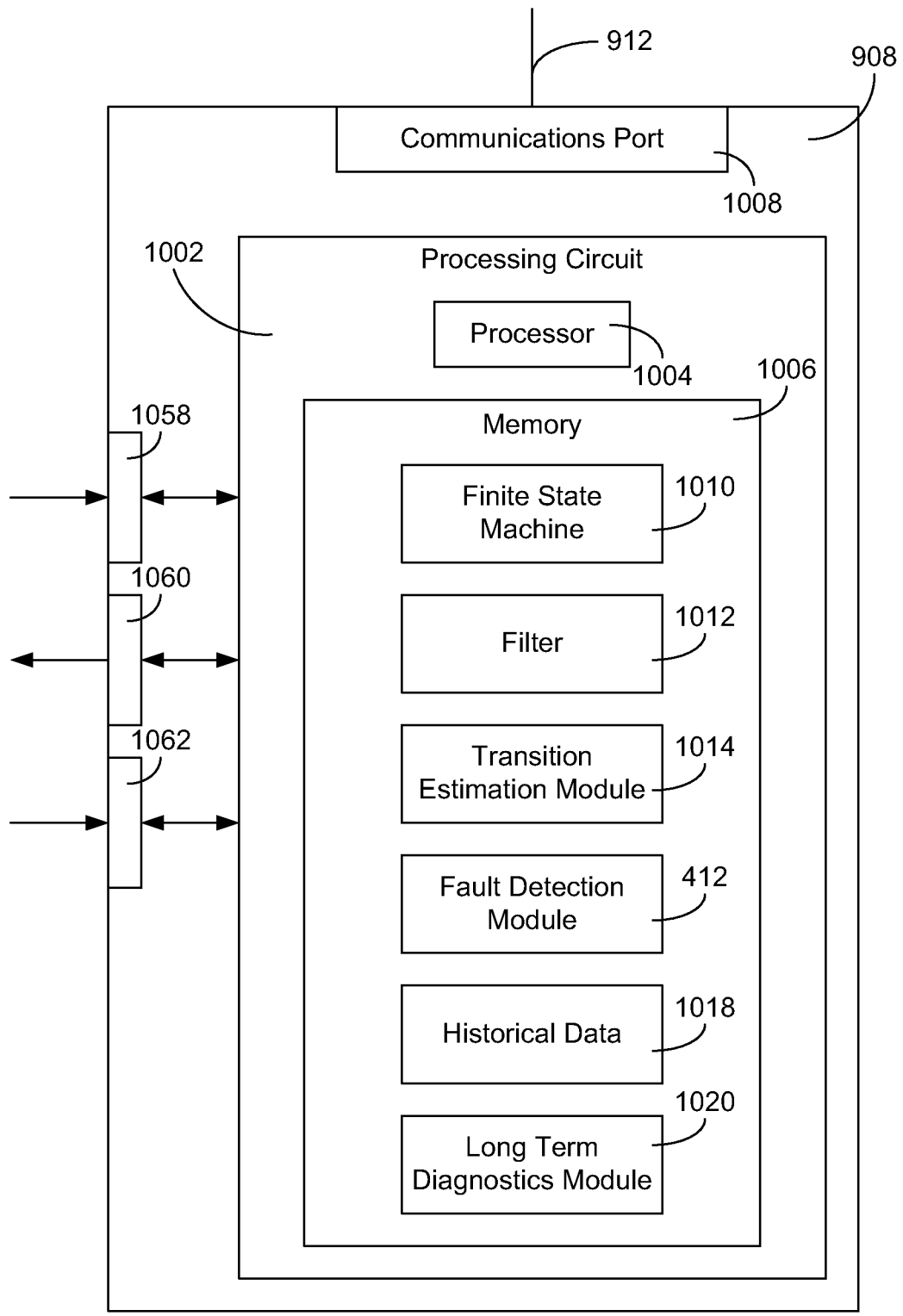
FIG. 10 is a detailed diagram of an air handling unit controller as shown in FIG. 9, according to an exemplary embodiment.

Referring now to FIG. 10, a more detailed block diagram of AHU controller 908 is shown, according to an exemplary embodiment. Controller 908 is shown to include interfaces 1058, 1060, and 1062. Controller 908 is shown to further include a processing circuit 1002 having a processor 1004 and memory 1006. Memory 1006 is shown to include finite state machine 1010, filter 1012, climate condition transition estimation module 1014, and fault detection module 412. Finite state machine 1010 is configured to determine a state in which the AHU should operate given various system inputs or conditions. Finite state machine 1010 includes control logic for transitioning to a new state when system inputs or conditions change. Finite state machine 1010 further includes control logic for operating the control system in any of the various possible states. Filter 1012 may be generally configured to smooth, filter, or otherwise transform inputs for use by the other modules of memory 1006.

Transition estimation module 1014 is configured to estimate conditions at which finite state machine 1010 will change states. Transition estimation module 1014 receives inputs from a variety of sources (e.g., sensors, the finite state machine, setpoint data from a supervisory controller, etc.). Transition estimation module 1014 may provide other modules (e.g., fault detection module 1016) with an estimate of, for example, a temperature at which finite state machine 1010 will transition from a heating state to a no heating state. Transition estimation module 1014 may be or include computer code for conducting a different estimate depending on the present state of the finite state machine. According to various other embodiments, transition estimation module 1014 calculates transition conditions for each possible state of the finite state machine at all times.

Fault detection module 412 may be embedded within AHU controller 908 to detect a fault of the AHU (e.g., the AHU operating in an incorrect state, the AHU transitioning incorrectly, etc.), according to an exemplary embodiment. Fault detection module 412 may receive estimates of conditions at which finite state machine 1010 will change states. According to some embodiments, fault detection module 412 includes the computer code or hardware of transition estimation module 1014. Fault detection module 412 may also or alternatively receive data regarding system transitions from historical data 1018. Historical data 1018 may be a table, relational database, or other information structure configured to store and retain information about historical conditions, state transitions, and the like. Fault detection module 412 may generally be configured to compare inputs to controller 908 or other current system conditions to estimates from module 412 to determine if a fault in the system exists.

In an exemplary embodiment, fault detection module 412 can utilize state information from finite state machine 1010 and/or historical data 1018 to evaluate fault detection rules. For example, AHU controller 908 may be in an operational state that sets heating coil valve 944 to a low limit setpoint. Fault detection module 412 can use the information relating to the operational state of AHU controller 908 to selectively evaluate the fault detection rules, i.e. only apply those rules corresponding to a low limit setpoint mode. Utilizing the operational state of AHU controller 908 within fault detection module 412 helps to reduce network utilization, since only detected faults need to be reported to master controller 906. If the fault detection were to occur on master controller 906 instead of AHU controller 908, the operational state of AHU controller 908 would need to be communicated to master controller 906, thereby increasing network utilization. In this manner, fault detection rules may be evaluated directly on any secondary controller controlled by a master controller.

Memory 1006 is further shown to include long term diagnostics module 1020. Long term diagnostics module 1020 may be configured to utilize historical data 1018 or to receive information about faults as detected by module 1016 to further log, process, or annotate data relating to system performance. Long term diagnostics module 1020 may further be configured to aggregate historical values of residuals evaluated by the fault detection module and described below. Long term diagnostics module 1020 may store these aggregations in memory for later retrieval. Long term diagnostics module 1020 may further be configured to provide a report of current or historical residuals or other fault information to another device via communications port 1008. For example, long term diagnostics module 1020 may be configured to generate and send a text message, data message, or an alarm or alert (e.g., to a supervisory controller, to a user device, etc.) when a fault is detected by the system (e.g., by the fault detection module).

According to an exemplary embodiment, long term diagnostics module 1020 (or another module such as fault detection module 1016 or filter 1012) may be configured to filter residual values (e.g., calculated by fault detection module 1016 and representing a comparison of actual performance to modeled performance) to remove noise or outliers prior to reporting any fault or other information. For example, a temperature sensor in the system may provide a spurious value to the controller that temporarily results in the detection of a fault, but, after a short period of time, this may be determined to be mere noise and may be filtered out by the system. Long term diagnostics module 1020 may further be configured to calculate and store in memory 1006 values such as a trend for a residual over time, a percentage of operating time that a fault is indicated by fault detection module 1016, or a "worst" value for a residual or fault over a period of time. When such a worst value is detected, the long term diagnostics module may further be configured to record a plurality of system values to store a "system snapshot." This system snapshot and worst-case fault may subsequently be reported (e.g., via e-mail, printed report, data communications, etc.) to another system for evaluation of what caused the worst-case condition. The long term diagnostics module may further be configured to generate reports or graphs regarding detected faults or residuals.

Configurations of Various Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on memory or other machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products or memory comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The invention claimed is:

1. A method for detecting faults in a building management system, the method comprising:
at a computer of the building management system, using a stored rule condition to detect a first fault in the building management system, the stored rule condition utilizing a stored threshold value;
using the computer to determine whether to adjust the stored threshold value based on at least one of fault detection data or building management system performance data, wherein determining whether to adjust the stored threshold value comprises identifying a frequency with which the first fault is detected when the stored threshold value is used in the stored rule condition and comparing the identified frequency with a stored frequency value, wherein the computer determines to adjust the stored threshold value in response to the identified frequency exceeding the stored frequency value;
determining a new threshold value for the stored rule condition in response to a determination to adjust the stored threshold value;
adjusting the stored rule condition to utilize the new threshold value by replacing the stored threshold value with the new threshold value, wherein the stored threshold value is replaced with the new threshold value in response to a determination to adjust the stored threshold value and wherein the stored threshold value is not replaced with the new threshold value in the absence of a determination to adjust the stored threshold value; and
at the computer, using the adjusted rule condition to detect a second fault in the building management system.

2. The method of claim 1, further comprising causing a graphical user interface to be displayed on an electronic display device, the graphical user interface configured to receive a new threshold value as user input, wherein the rule condition is adjusted in response to the user input.

3. The method of claim 1, wherein a processing circuit completes the determining and adjusting steps automatically and without user input.

4. The method of claim 1, wherein the new threshold value is determined by comparing the stored threshold value to an estimated error for a measurement value obtained from a sensor.

5. The method of claim 1, wherein the new threshold value is determined by comparing an estimated power consumption of a controlled device to an actual power consumption of the controlled device.

6. The method of claim 1, wherein the rule condition comprises a trigger condition and a content condition, and wherein using the adjusted rule condition to detect a fault in the building management system further comprises checking the trigger condition to determine whether to process the content condition.

7. The method of claim 6, wherein the trigger condition includes one or more criteria for determining whether to process the content condition, and wherein the content condition includes one or more criteria for comparing a parameter of the building management system with a threshold value;
   wherein using the adjusted rule condition to detect a fault further comprises:
      in response to a determination that the trigger condition is satisfied, detecting a fault by processing the content condition; and
      in response to a determination that the trigger condition is not satisfied, not processing the content condition.

8. The method of claim 1, wherein the fault detection data comprises a history of detected faults and the computer determines the new threshold value such that the adjusted rule condition results in a reduced fault detection frequency relative to the identified frequency.

9. The method of claim 1, wherein the computer of the building management system comprises at least one of a master controller and a second controller that is controlled by a master controller, the method further comprising:
   at the second controller, collecting building equipment data from building equipment and using the collected building equipment data to control the building equipment;
   at the second controller, processing the collected building equipment data relative to a rule condition;
   at the second controller, detecting a fault in the building equipment based on the processing of the collected building equipment data relative to the rule condition; and
   reporting the detected fault to the master controller from the second controller.

10. A method for detecting faults in a building management system, the method comprising:
   using a master controller to control a second controller;
   at the second controller, collecting building equipment data from building equipment and using the collected building equipment data to control the building equipment;
   at the second controller, processing the collected building equipment data relative to a rule condition, wherein the rule condition utilizes a stored threshold value;
   at the second controller, detecting a fault in the building equipment based on the processing of the collected building equipment data relative to the rule condition;
   reporting the detected fault to the master controller from the second controller
   determining whether to adjust the stored threshold value based on at least one of fault detection data or building management system performance data, wherein determining whether to adjust the stored threshold value comprises identifying a frequency with which the fault is detected when the stored threshold value is used in the rule condition and comparing the identified frequency with a stored frequency value;
   determining a new threshold value for the stored rule condition in response to a determination that the identified frequency exceeds the stored frequency value;
   adjusting the stored rule condition to utilize the new threshold value by replacing the stored threshold value with the new threshold value, wherein the stored threshold value is replaced with the new threshold value in response to a determination that the identified frequency exceeds the stored frequency value and wherein the stored threshold value is not replaced with the new threshold value in the absence of a determination that the identified frequency exceeds the stored frequency value; and
   using the adjusted rule condition to detect a second fault in the building management system.

11. The method of claim 10, wherein the second controller is an equipment controller that directly controls the building equipment.

12. The method of claim 10, wherein the rule condition is selectively used based on an operational state of at least one of the building equipment and the second controller.

13. The method of claim 10, wherein the second controller conducts the collecting, processing, and detecting steps without querying or receiving data from the master controller, another upstream controller, or a downstream controller.

14. The method of claim 10, wherein the second controller is an air handling unit controller and the collected building equipment data comprises sensor and actuator data for an air handling unit.

15. The method of claim 10, wherein the second controller is a lowest level controller of the building management system.

16. The method of claim 10, wherein the rule condition comprises a trigger condition and a content condition; and wherein using the adjusted rule condition to detect a fault in the building management system further comprises checking the trigger condition to determine whether to process the content condition.

17. The method of claim 16, wherein the trigger condition includes one or more criteria for determining whether to process the content condition, and wherein the content condition includes one or more criteria for comparing a parameter of the building management system with a threshold value;
   wherein using the adjusted rule condition to detect a fault further comprises:
      in response to a determination that the trigger condition is satisfied, detecting a fault by processing the content condition; and
      in response to a determination that the trigger condition is not satisfied, not processing the content condition.

18. The method of claim 10, further comprising:
   determining a need for a threshold adjustment of the rule condition; determining a new threshold value for the rule condition; and adjusting the rule condition to utilize the new threshold value.

19. A method for detecting faults in a building management system, the method comprising:
   recalling a stored rule at a computer of the building management system;
   identifying, by the computer, a trigger condition and a content condition for the stored rule, wherein the trigger condition includes one or more criteria for determining whether to process the content condition, and wherein the content condition includes one or more criteria for comparing a parameter of the building management system with a threshold value, wherein at least one of the trigger condition and the content condition utilizes a stored threshold value;
   checking, by the computer, the trigger condition to determine whether to process the content condition;

in response to a determination that the trigger condition is satisfied, detecting, by the computer, a fault by processing the content condition;

in response to a determination that the trigger condition is not satisfied, not processing the content condition;

determining whether to adjust the stored threshold value based on at least one of fault detection data or building management system performance data, wherein determining whether to adjust the stored threshold value comprises identifying a frequency with which the fault is detected when the stored threshold value is used in the rule condition and comparing the identified frequency with a stored frequency value;

determining a new threshold value for the stored rule condition in response to a determination that the identified frequency exceeds the stored frequency value;

adjusting the stored rule condition to utilize the new threshold value by replacing the stored threshold value with the new threshold value, wherein the stored threshold value is replaced with the new threshold value in response to a determination that the identified frequency exceeds the stored frequency value and wherein the stored threshold value is not replaced with the new threshold value in the absence of a determination that the identified frequency exceeds the stored frequency value; and using the adjusted rule condition to detect a second fault in the building management system.

20. The method of claim 19, wherein the trigger condition is a time delay based on an amount of time needed for a controller to reach a steady state, and wherein the checking step comprises delaying processing of the content condition for the time delay specified by the trigger condition.

21. The method of claim 19, wherein the trigger condition is based on an operational state of a controller, and wherein the checking step comprises:

recalling a current operational state of the controller from a finite state machine within the controller; and comparing the trigger condition to the current operational state of the controller.

22. The method of claim 19, wherein the trigger condition is stored within a library of predefined trigger conditions in a memory;

wherein the content condition is stored within a library of predefined content conditions in a memory;

wherein the method comprises building a rule by selecting (a) at least one trigger condition from the library of predefined trigger conditions and (b) at least one content condition from the library of predefined content conditions.

23. The method of claim 19, further comprising:

recalling a trigger condition from a library of predefined trigger conditions; recalling a content condition from a library of predefined content conditions; causing a graphical user interface to be displayed on an electronic display device, the graphical user interface configured to receive user input;

associating the trigger condition and the content condition to form a rule in response to the user input; and storing the rule in a memory.

24. The method of claim 19, wherein the computer of the building management comprises at least one of a master controller and a second controller that is controlled by a master controller, the method further comprising:

at the second controller, collecting building equipment data from building equipment and using the collected building equipment data to control the building equipment;

at the second controller, processing the collected building equipment data relative to a rule condition;

at the second controller, detecting a fault in the building equipment based on the processing of the collected building equipment data relative to the rule condition; and reporting the detected fault to the master controller from the second controller.

* * * * *